US008768791B2

(12) United States Patent
Harper et al.

(10) Patent No.: US 8,768,791 B2
(45) Date of Patent: Jul. 1, 2014

(54) USER-PERSONALIZED MEDIA SAMPLING, RECOMMENDATION AND PURCHASING SYSTEM USING REAL-TIME INVENTORY DATABASE

(75) Inventors: Gregory W. Harper, New York, NY (US); Steven E. Skiba, Morris Plains, NJ (US)

(73) Assignee: Trans World New York LLC, Albany, NY (US)

(*) Notice: Subject to any disclaimer, the term of this patent is extended or adjusted under 35 U.S.C. 154(b) by 862 days.

(21) Appl. No.: 11/772,931

(22) Filed: Jul. 3, 2007

(65) Prior Publication Data

US 2008/0015942 A1    Jan. 17, 2008

Related U.S. Application Data

(63) Continuation of application No. 11/636,544, filed on Dec. 11, 2006, which is a continuation of application No. 10/258,848, filed as application No. PCT/US02/25741 on Aug. 14, 2002, now Pat. No. 7,174,312.

(60) Provisional application No. 60/312,370, filed on Aug. 16, 2001.

(51) Int. Cl.
*G06Q 20/00* (2012.01)

(52) U.S. Cl.
USPC ............................................. 705/29; 705/28

(58) Field of Classification Search
USPC ............... 235/375, 383, 462.45; 340/825.25; 705/14, 27, 51, 57, 80, 1, 26; 709/206, 709/218, 233, 201, 220, 223
See application file for complete search history.

(56) References Cited

U.S. PATENT DOCUMENTS

| 5,237,157 | A | 8/1993 | Kaplan |
| 5,392,066 | A | 2/1995 | Fisher et al. |
| 5,572,653 | A | 11/1996 | DeTemple et al. |
| 5,918,213 | A | 6/1999 | Bernard et al. |
| 5,963,136 | A | 10/1999 | O'Brien |
| 5,963,916 | A | 10/1999 | Kaplan |
| 6,133,908 | A | 10/2000 | Scibora et al. |
| 6,195,436 | B1 | 2/2001 | Scibora et al. |
| 6,300,880 | B1 * | 10/2001 | Sitnik ........................... 340/4.4 |
| 6,430,554 | B1 | 8/2002 | Rothschild |
| 6,480,188 | B1 | 11/2002 | Horsley |
| 6,563,801 | B2 * | 5/2003 | Makinen et al. .............. 370/276 |
| 6,978,301 | B2 * | 12/2005 | Tindal ........................... 709/223 |
| 2002/0045960 | A1 | 4/2002 | Phillips et al. |
| 2002/0045961 | A1 | 4/2002 | Gibbs et al. |
| 2002/0046315 | A1 | 4/2002 | Miller et al. |

FOREIGN PATENT DOCUMENTS

WO    WO 98/38589    9/1998

OTHER PUBLICATIONS

Letter from Mexican associate dated Aug. 23, 2007 re issued Office Action in Mexican patent application No. PA/A/2004/001463, 2 pp.
Anonymous, "Trans World Entertainment/FYE and Interactive Objects Launch New In-Store Multimedia Station", Oct. 24, 2001, http://web.arch ive.org/web/20021209022159/www.fullplaymedia.com/newsroom/newsroom_archive/pr2001_10_24.htm.
Gillis, C., "Fullplay Media Signs Transworld Deal-Company Works With Microsoft on Digital Media", Eastside Journal Apr. 29, 2002.

* cited by examiner

*Primary Examiner* — Scott Zare
*Assistant Examiner* — Rokib Masud
(74) *Attorney, Agent, or Firm* — Rothwell, Figg, Ernst & Manbeck, P.C.

(57)    ABSTRACT

A product sampling and recommendation system uses customer profile data and/or real-time information from a point-of-sale system to tailor specific product recommendations to a customer using a sampling station.

14 Claims, 27 Drawing Sheets

USER-PERSONALIZED MEDIA SAMPLING, RECOMMENDATION AND PURCHASING SYSTEM USING REAL-TIME INVENTORY DATABASE

CROSS-REFERENCE TO RELATED APPLICATION

This application is a continuation of patent application Ser. No. 11/636,544, filed on Dec. 11, 2006 (status: pending), which is a continuation of patent application Ser. No. 10/258,848, filed on Mar. 7, 2003 (now U.S. Pat. No. 7,174,312), which is a National Stage Entry of PCT/US02/25741, filed on Aug. 14, 2002, which claims the benefit of the filing date of Provisional Application No. 60/312,370 filed on Aug. 16, 2001.

BACKGROUND OF THE INVENTION

1. Field of the Invention

The present invention generally relates to systems that allow customers to preview or sample the content of media products, such as CDs, DVDs, software, video games, etc. prior to purchase. In particular, the present invention relates to a system that connects media sampling stations located within multiple retail locations to data source, inventory management, point-of-sale, and customer relationship management systems, and that thereby allows the sampling stations to present a user-individualized interactive menu to a customer, which is configured in substantially real-time to take into account present inventory, pricing, and sale items, as well as a customer's preferences, purchasing history, personal information and wish list information.

2. Description of the Background Art

Systems and methods for previewing and remote purchasing of multimedia products are generally known in the art, see, e.g., U.S. Pat. No. 5,918,213 to Bernard et al., U.S. Pat. Nos. 6,195,436 and 6,133,908 to Scibora et al., and U.S. Pat. Nos. 5,237,157 and 5,963,136 to Kaplan.

For example, the '213 patent ("Bernard") discloses a remote product purchasing system wherein customers can shop for and purchase products through a remote communication medium (such as a telephone, a network data connection, or a direct data link). When the customer accesses the system, she is able to browse through various product selections offered by the product purchasing system. For example, where the customer has only voice access, a spoken description or audio sample of the product may be provided. Where the customer is connected to the product purchasing system over a network such as the Internet, a visual description such as a movie clip, also may be provided. The customer may browse according to product name, product category, or according to top seller lists of product categories. The customer then may place an order for desired merchandise through the remote communication medium, by providing payment information such as a credit card number, and shipping information identifying a location at which the customer desires to accept delivery of the purchased merchandise. While Bernard describes one possible use of a remote communication medium having a direct data link to the automated product purchase system from a retail store, the product purchase system either is not associated with the retail store but represents a different merchant, or is associated with a single retail location only. Further, while Bernard discloses the storage of customer information, the stored customer information is not used to tailor the presentation of information to the customer.

The '157 patent to Kaplan discloses a standalone kiosk containing stored information from which a customer may obtain selections for sampling or previewing. For example, the kiosk contains a number of CD-ROM disks containing preselected music samples of which a customer may listen.

The '916 patent to Kaplan discloses a website to which a user is uniquely identified in order to allow the user to gain access to the website and select particular samples of recorded music products for prelistening. The user's selections are recorded to develop market research data.

While various systems for sampling music, video and other multimedia products are described in the prior art, none of the prior art systems even attempt to provide a comprehensive individual customer oriented system wherein a customer's preferences and other personal information are used to provide a customer-specific interactive experience at a retail location. Further, none of the prior art systems allow the same customer-specific experience over a remote network connection (such as the Internet) as well as at a retail location.

SUMMARY OF THE INVENTION

According to one aspect of the present invention, a networked product sampling system has a plurality of sampling stations distributed at various locations in a retail site, each sampling station including a display and an audio output device for playing samples of product content of products for sale by the retail site, and a database coupled to said plurality of sampling stations through a central server and storing sample content and meta data related to products for sale at the retail site, wherein each of the sampling stations is associated with a unique location ID identifying the location of the associated sampling station within the retail site, such that the central server determines particular meta data to be sent to a sampling station to be displayed in accordance with the unique location ID associated with that sampling station.

According to another aspect of the invention, a user-personalized product sampling and recommendation system has a database storing individual customer profile data files each associated with a unique customer identification number identifying a customer to whom the customer profile data file relates, wherein said customer profile data includes customer preferences regarding categories or genres of products available for purchase by the customer, the database further including sample content and meta data related to products for sale at the retail site, a plurality of sampling stations distributed at various locations in the retail site, each sampling station including a display and an audio output device for playing samples of product content of products available for purchase by the customer, and an input mechanism for enabling a customer to input to said station a unique customer identification number assigned to the customer, and a server that receives a unique customer identification number from a sampling station, retrieves from the database corresponding customer profile data, and generates customer-specific information for display by the sampling station sending the customer identification number according to the retrieved customer profile data.

According to yet another aspect of the invention, a networked product sampling system has a plurality of sampling stations distributed at various locations in a retail site, each sampling station including a display and an audio output device for playing samples of product content of products for sale by the retail site, a database coupled to the plurality of sampling stations through a central server and storing sample content and meta data related to products for sale at the retail site, the central server being connected to an external communication network, and a point-of-sale (POS) database storing sales and inventory data for all products being sold by said retail site, wherein the retail site is associated with a plurality of retail sites of a merchant, and is identified by a unique ID identifying the location of the retail site, such that the central server determines particular meta data and content samples to be retrieved over the external communication network for storage by the database in accordance with inventory data received from the POS database, arid the merchant stores the identity of meta data and content samples contained at each retail site in association with the unique ID of each retail site.

According to a still further aspect of the invention, a system for providing product recommendations to a customer includes a plurality of sampling stations distributed at various locations in a retail site, each sampling station including a display and an audio output device for playing samples of product content of products for sale by the retail site, and including an input device that enables a customer to input a product's identification information for retrieval of said content samples a retail site server, a recommendation rules database, a content database coupled to the plurality of sampling stations through the retail site server and storing sample content and meta data related to products for sale at the retail site, and a POS database coupled to the retail site server and storing inventory data of products which are in stock at the retail site, wherein the retail site server generates a first list of recommended products for sampling by a customer based on a product ID input by the customer at a sampling station of a product that the customer wishes to sample, a recommendation rule retrieved from the recommendation rules database, and based on the stored inventory data.

BRIEF DESCRIPTION OF THE DRAWINGS

The invention will become more clearly understood from the following detailed description in connection with the accompanying drawings, in which.

DETAILED DESCRIPTION OF THE PREFERRED EMBODIMENTS

Figure 1:
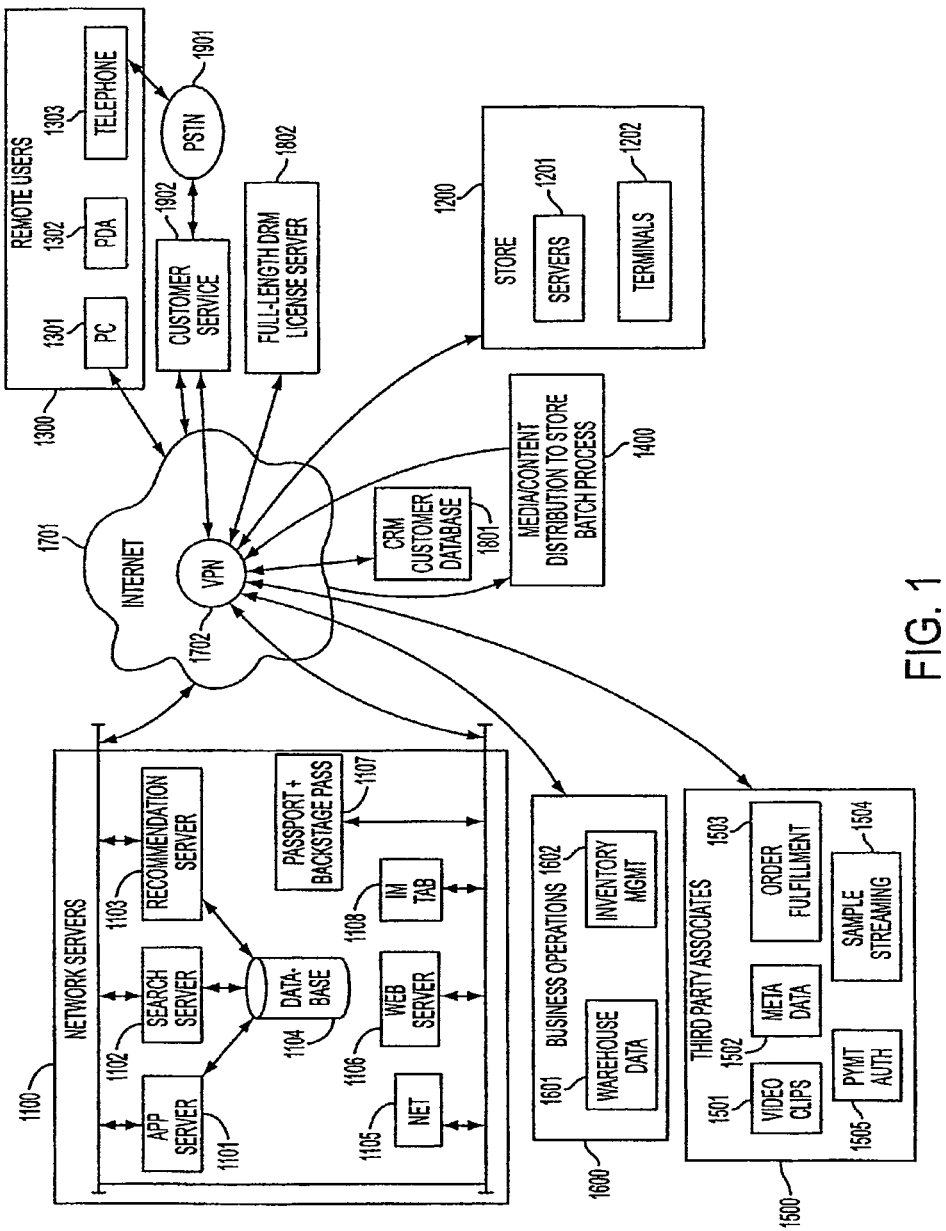
FIG. 1 is a block diagram of a system for providing user-personalized media sampling, recommendation and purchasing according to one embodiment of the present invention.

Referring to FIG. 1, a system for providing user-personalized media sampling, recommendation and purchasing capability according to one preferred embodiment of the invention is shown.

The system includes a number of network servers 1100; retail location (store) firmware 1200 including store servers 1201 and store terminals 1202; and remote users 1300, including PC users 1301, PDA (Personal Digital Assistant) users 1302, and telephone users 1303. Store firmware (i.e., hardware and software) 1200 represents the configuration of a single retail location; in implementation many retail locations 1200 would be connected to the network.

The system further includes a number of third party associates 1500, including a video clips provider 1501, meta data provider 1502, an order fulfillment provider 1503, a streaming content sample provider 1504, and a payment authorization provider (i.e., for credit card authorization) 1505. One or more of the services and/or data provided by the third party associates may be provided by the same provider. A media/content distribution to store batch process 1400 operates to acquire meta data and content samples from third party associate providers 1500 over the Internet, and to assemble and distribute such data and content to the various stores 1200 through the VPN 1702.

Business operations 1600 of the merchant include a central warehouse inventory database 1601 and an inventory management system 1602. The warehouse inventory database is accessed by the store servers 1201 and network web server 1106 to determine whether particular customer-requested product is in stock.

The network servers 1100 include an application server 1101, a search server 1102, a recommendation server 1103, a database 1104, an Internet user profile server, such as Microsoft.net™ server 1105, a Web server 1106 that provides a web site with one or more web pages to Internet clients, a passport and backstage pass server 1107 for providing customer user profile identification recognition, and an Instant Message tab server 1108 for providing recommendation and content transfer through an instant messaging program over the Internet.

A customer service center 1902 is provided, which may communicate with telephone users 1303 through the Public Switched Telephone Network (PSTN) 1901, and may communicate with PC users 1301 and PDA users 1302 through the Internet 1701. The customer service center 1902 may communicate with a Customer Relationship Management (CRM) database 1801 through a Virtual Private Network (VPN) 1702. VPN 1702 is shown in FIG. 1 within Internet 1701 because the VPN may be constructed to operate within and through the Internet.

To comply with copyright laws, in general video clips 1501 and sample streaming files 1504 are strictly limited in terms of length and proportion with respect to the entirety of a piece of content, such as a sound recording or a motion picture. A full length Digital Rights Management (DRM) License Server 1802 is provided whereby the entirety of an audio or video program may be provided to a customer where distribution of such program has been duly licensed by the copyright owner or clearing house.

Figure 2:
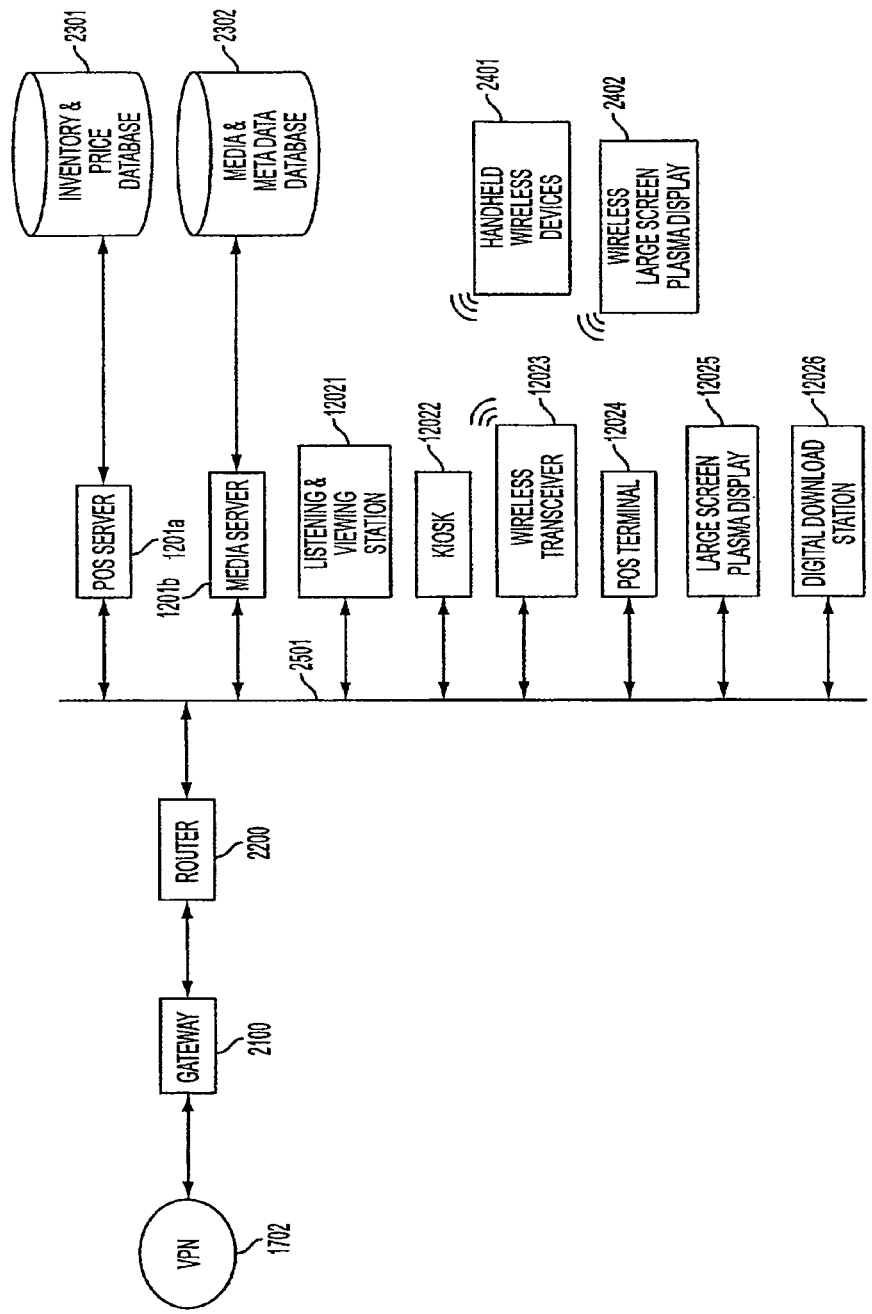
FIG. 2 is a block diagram of a system configuration of a retail location according to one embodiment of the present invention.

A detailed description of the configuration of the hardware and software provided at a retail location 1200 is shown in FIG. 2. Each store is connected to the remainder of the system through the VPN 1702 via a gateway 2100 and a router 2200. Each store may include a Point Of Sale (POS) server 1201*a* and associated local inventory and price database 2301, and a media server 1201*b* and associated media (content) and meta data database 2302.

Additionally, each store may include a number of listening and viewing stations (LVS) 12021, stand alone kiosks 12022, wireless transceivers 12023, POS terminals 12024, one or more large screen plasma displays 12025, and digital download stations 12026. The wireless transceiver(s) 12023 may communicate with hand-held wireless devices 2401, such as iPAQs™ for example, and also may communicate with wireless large screen plasma displays 2402. The large screen plasma displays 12026 and 2402 can be strategically placed in the retail location and provided with content generally applicable to the customer population as a whole, such as music videos, movie trailers, special announcements, commercials, etc. The handheld wireless devices may receive display screens and content samples similar to the screens and samples displayed and rendered by the kiosks and LVS devices, as will be explained in detail below. Additionally, the handheld devices may be carried by sales associates for quick access to the store's databases, and as a communication device with the store's servers such that the store servers may send a message to the sale associate when customer assistance is requested, etc.

The digital download station 12026 may provide content to a portable data player such as an MP3 player device. All of the various devices are connected to the POS server, media server, and the entire network, via a communication bus 2501. Kiosks 12022 typically include a display monitor, bar code scanner, credit card input mechanism, and keyboard that allows a customer to enter alphanumeric information and to place merchandise orders.

Figure 3:
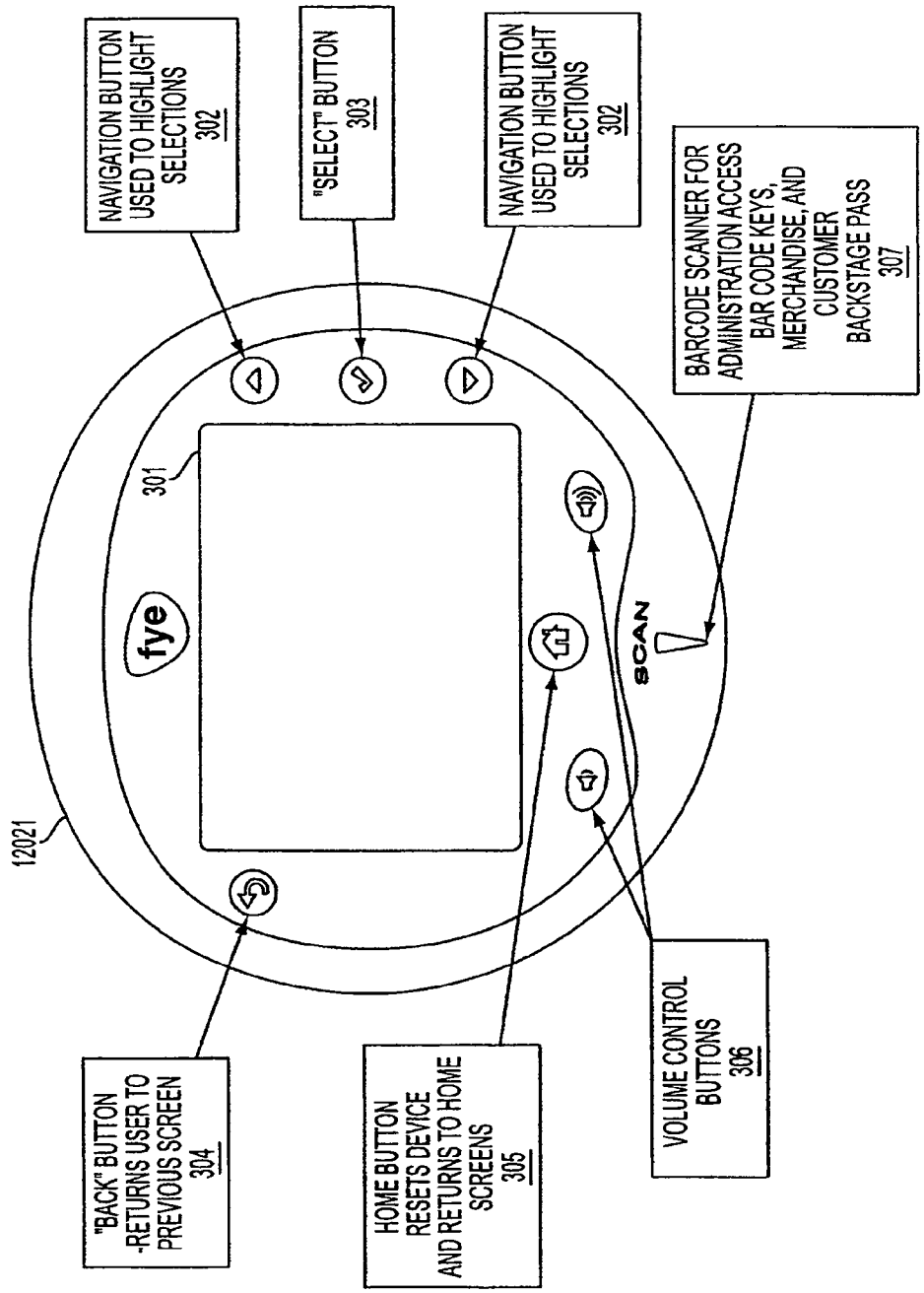
FIG. 3 is an elevational view of a listening and viewing station (LVS) according to one embodiment of the present invention.

A detailed description of the LVS 12021 will now be described with reference to FIG. 3 and following screen shot drawing figures. The LVS includes a display screen 301 (which may be a thin-film transistor LCD, plasma discharge display, or any other suitable type of display), "up" and "down" navigation buttons 302, a select button 303, a "back" button 304, a "home" button 305, volume control buttons 306, and a bar code scanner 307.

Figure 4B:
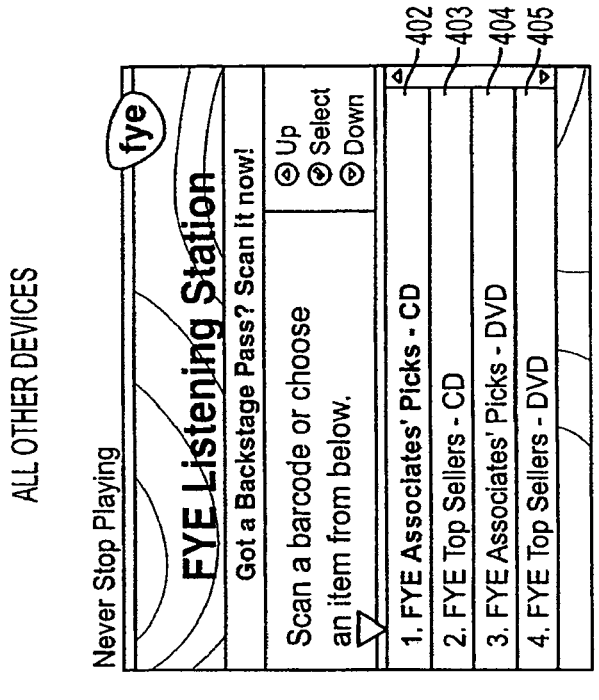
FIGS. 4A-4B, 5A-5B, 6, and 7A-7C are screen shots of various display screens displayed on the LVS according to one embodiment of the present invention.
Figure 4A:
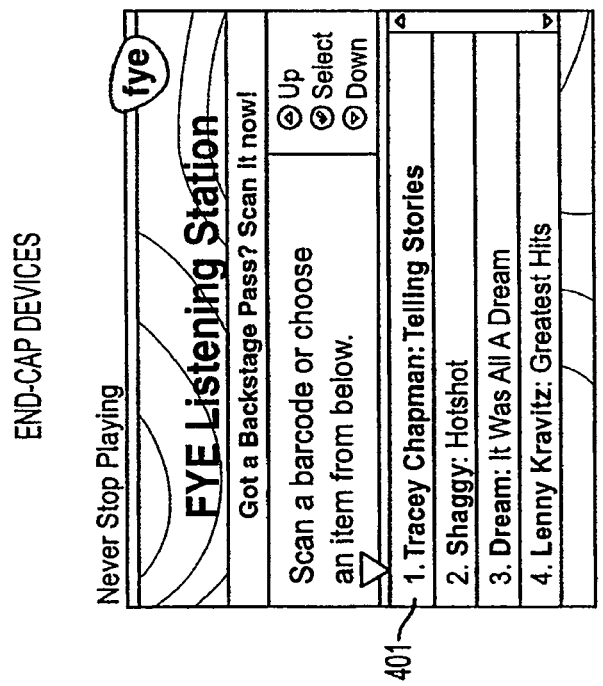

The navigation buttons 302 are used to scroll through different items displayed in the display screen 301, with a currently selected item being highlighted or contrasted with all other selectable items, as shown in FIG. 4A as selected item 401, for example. When further information about a highlighted item is desired, the select button 303 is pressed. Actuation of the select button 303 thus causes a new screen to be displayed in the display 301. If the user desires to return to the previous screen, the "back" button 304 is actuated. Alternatively, if the user desires to return to the home screen from any other screen, the "home" button 305 is actuated. Volume control buttons 306 allow the user to control the volume of audio content being played at the LVS 12021. Audio may be played through headphones attached to the LVS device, or may be played through built-in speakers provided in the LVS device. Bar code scanner 307 scans bar codes of product placed adjacent to the scanner window (not shown) by the user. The bar codes are sent by the LVS to the media server 1201*b* or POS server 1201*a*, which in turn retrieve information about the scanned product from their respective databases 2302 and 2301, as shown in FIG. 2.

According to a feature of the present invention, each LVS in a retail site is associated with a specific location ID identifying a specific location within the retail site. For example, in a music store, merchandise is typically arranged by genre in aisles or racks. Additionally, separate merchandise displays may be provided for other subgroups of merchandise, such as a "Top 100 Hits" or "Top Sellers" wall or rack.

According to the present invention, each LVS location in the retail store has associated therewith a unique location ID, such that different default screens may be displayed on different LVS devices according to their location. For example, an "end-cap" LVS device is one which is placed at the end of an aisle containing product, such as for example music CDS. Additionally, LVS devices may be located at a "hit wall" and associated with current top selling products. As shown in FIG. 4A, such end-cap or "hit wall" devices may have a default screen displaying preferred product selections that are located on the "hit wall" or in a particular aisle. As shown in FIG. 4B, other LVS devices, such as LVS devices located within an aisle, or stand-alone LVS devices, may have a default screen displaying different list categories, such as store associates' preferred CD selections or "picks" 402, Top CD Sellers 403, associates' DVD picks 404, and Top DVD Sellers 405.

Figure 6:
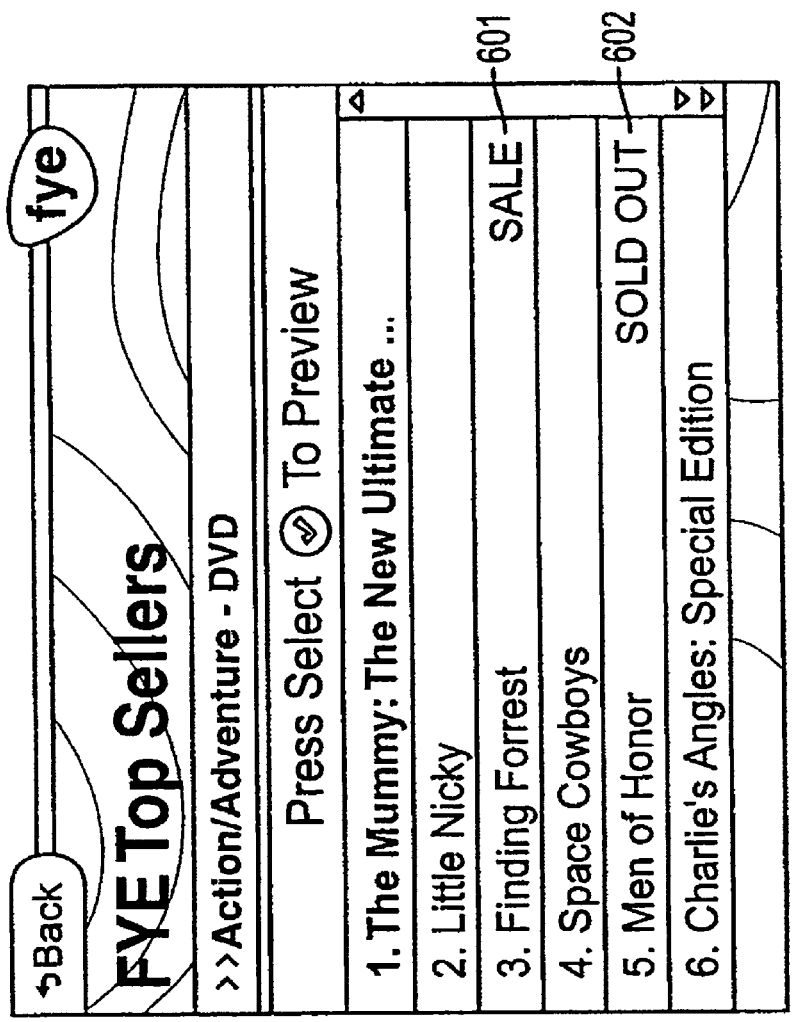

For example, as shown in FIG. 6, when a customer selects Top Seller DVDs 405 from the screen of FIG. 4B, a new screen is displayed, listing current best selling DVDs. The list of best selling DVDs may be national best selling DVDs obtained through the Internet from third party associates 1500 that compile such data (FIG. 1). Alternatively, the best selling DVDs may represent top sellers from among all locations of the retail establishment, or top sellers from within the specific retail site where the LVS is located. The present invention allows these alternative categories to be compiled and displayed by virtue of the Internet and virtual private network connections of the retail locations to headquarters/management servers 1100, and by virtue of the connection of the POS terminal and inventory data of each retail location to the content sampling devices.

Thus, as shown in FIG. 6, real-time information concerning product status, such as whether a particular selection is current on sale as indicated at 601, or whether a particular selection is sold out as indicated at 602, can be displayed to the customer. Similar information is displayed to the customer when associates' picks are selected, and the information can be provided for all product categories, such as CDS, software, video games, books, etc.

Figure 5A:
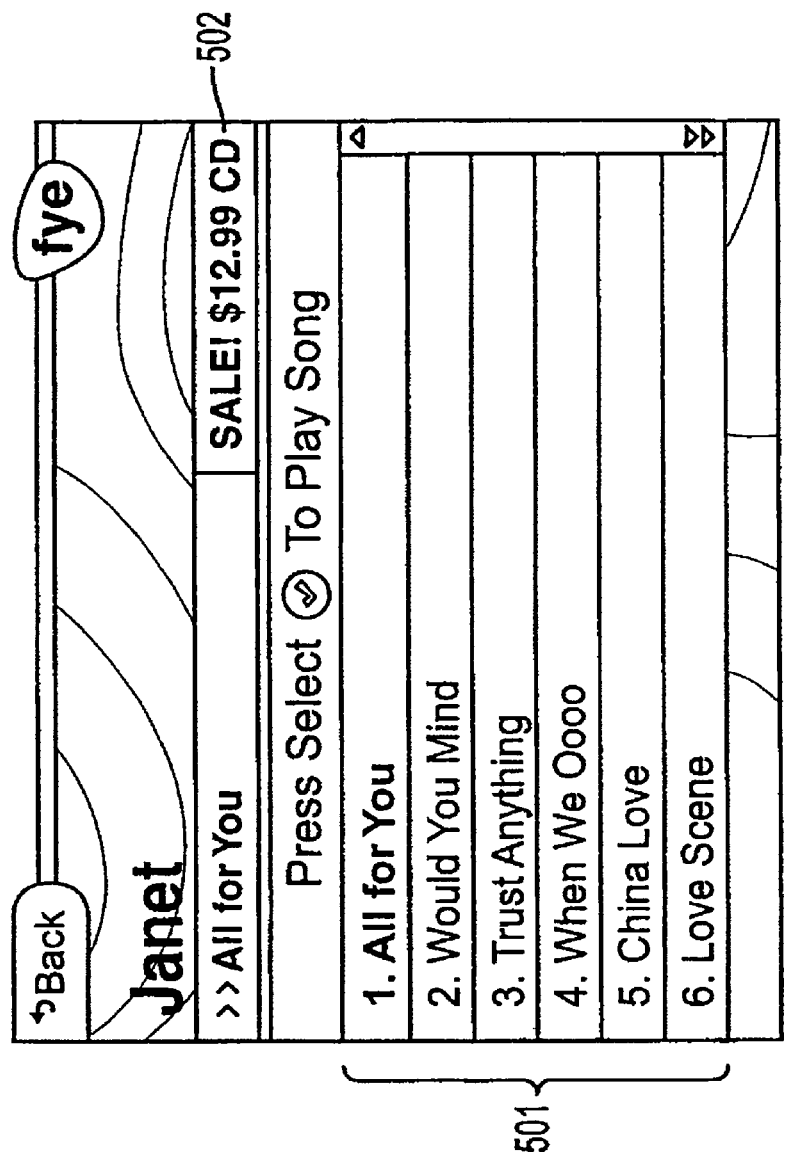
Figure 5B:
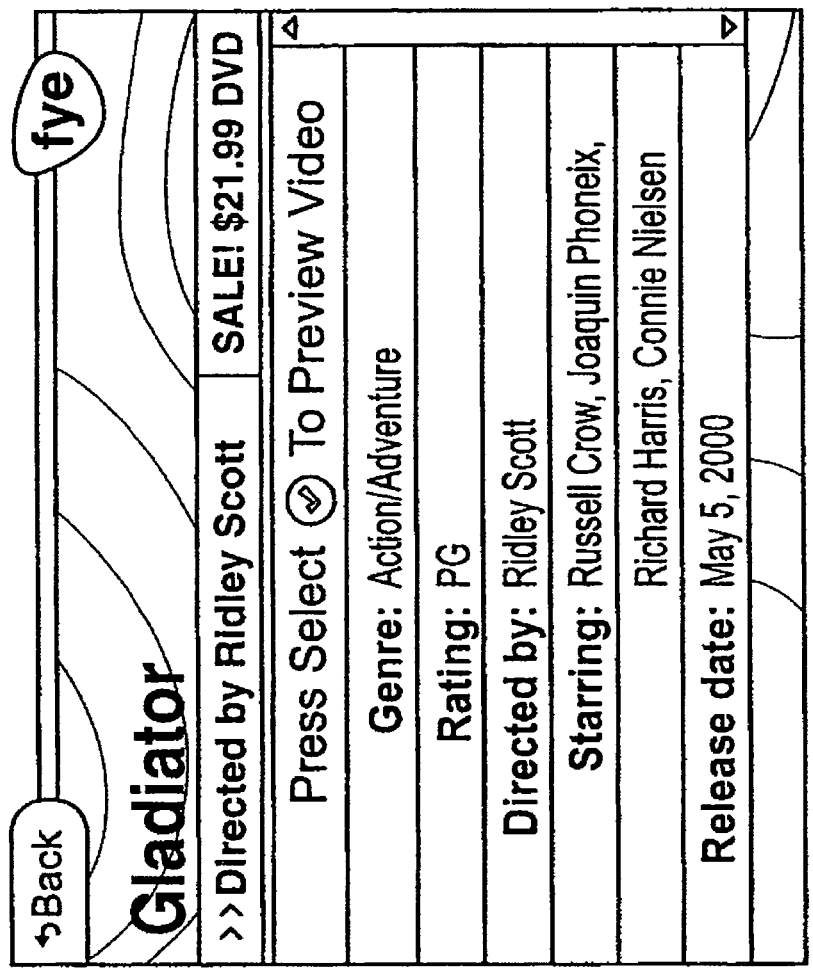

According to the invention, when a customer places a bar code from a product under the bar code scanner 207, information pertaining to the scanned product is gathered from the media and POS servers and presented to the user on a screen, as shown in FIG. 5A. In particular, for an audio CD, individual tracks 501 from the CD are displayed for selection by the customer in order to listen to samples of those tracks, and if the selection is on sale, a sale indication 502 is presented in the screen to notify the customer that the product is currently on sale. The customer may scroll through the available CD tracks using the navigation buttons 302, and select particular track samples for listening by actuating the select button 303. Similarly, when a customer scans a DVD as shown in FIG. 5B, content information regarding the DVD, and on-sale information, if any, are displayed in the screen display. In the case of a DVD, the customer may simply actuate the select button to view a selected video clip from the DVD. Alternatively, different clips may be provided for selection by the customer, similarly to the different tracks of an audio CD, whereby the customer may scroll through the choices using the navigation buttons and select a particular video clip by actuating the select button when the desired clip is highlighted on the screen.

According to the invention, customers may register with the retail establishment to set up a personal profile. Each customer's profile is stored in a customer profile sector of a database 1104, which is accessed and maintained by customer identification (i.e., Passport™ and Backstage Pass™) server 1107 (FIG. 1) together with a unique customer identification number. The customer's identification number preferably is provided to the customer in the form of a customer personalization card, called a Backstage Pass™, that preferably contains the customer's identification number encoded in the form of a bar code. Alternatively, the customer identification information could be stored electronically as an ID tag together with a RF inductive coil that is excited by a RF proximity detector, which could be located at the entrance to the retail store, at each sampling station, POS terminal, etc. The RF proximity detection card thus represents a passive alternative to the active bar-code card which must be scanned by the customer. The customer's name and identification number also may be provided on the card in plain text.

The customer may enter and register her profile in a number of ways: by filling out a paper form provided at a retail store, by registering online at a website of the retail merchant, by e-mail, facsimile transmission or telephone. The customer's profile preferably includes the customer's name, residence address, and preferred product genres, such as movie and music genres, and optionally book, software and video game genres. In addition to specifying general product preferences, the customer may enter particular product titles into a wish list stored as a data file in the customer profile database along with the customer's profile. Additionally, the customer's birth date or day and month of birth may be provided in the profile, in order to provide the customer with special offers, discounts, or free gift rewards on her birthday. The customer also may provide her e-mail address so that special offers or promotions may be communicated to the customer via e-mail messages. The customer also may be allowed to update and/or modify her customer profile through on-line access at the merchant's website.

Additionally, a customer may enter or upload to the customer database server her personal list of owned CDS, DVDs, etc. on-line. Thereafter, the customer may view her list of owned CDS either on the merchant's website or at the retail locations, as a aid to avoid duplication in purchasing titles or variations of selections already owned by the customer.

The customer's Backstage Pass™ also may be linked to an Internet User identification profile, such as the Microsoft Passport™, such that the customer may be recognized each time the customer logs on to the Internet using her Passport.™

The customer profile preferably tracks the customer's tastes and preferences by storing the identity of products that the customer purchases in conjunction with presentation of the customer identification number. In this manner, predictions of a customer's interest in specific new products, and suggestions and recommendations of existing products may be made and presented to the customer based on the customer's past purchasing history. Additionally, a frequent purchaser program may be implemented whereby the customer receives bonus points for each purchase made, where bonus points may be redeemed for free products, product discounts, free or discounted services, or other related rewards based on predetermined bonus point totals.

Figure 7A:
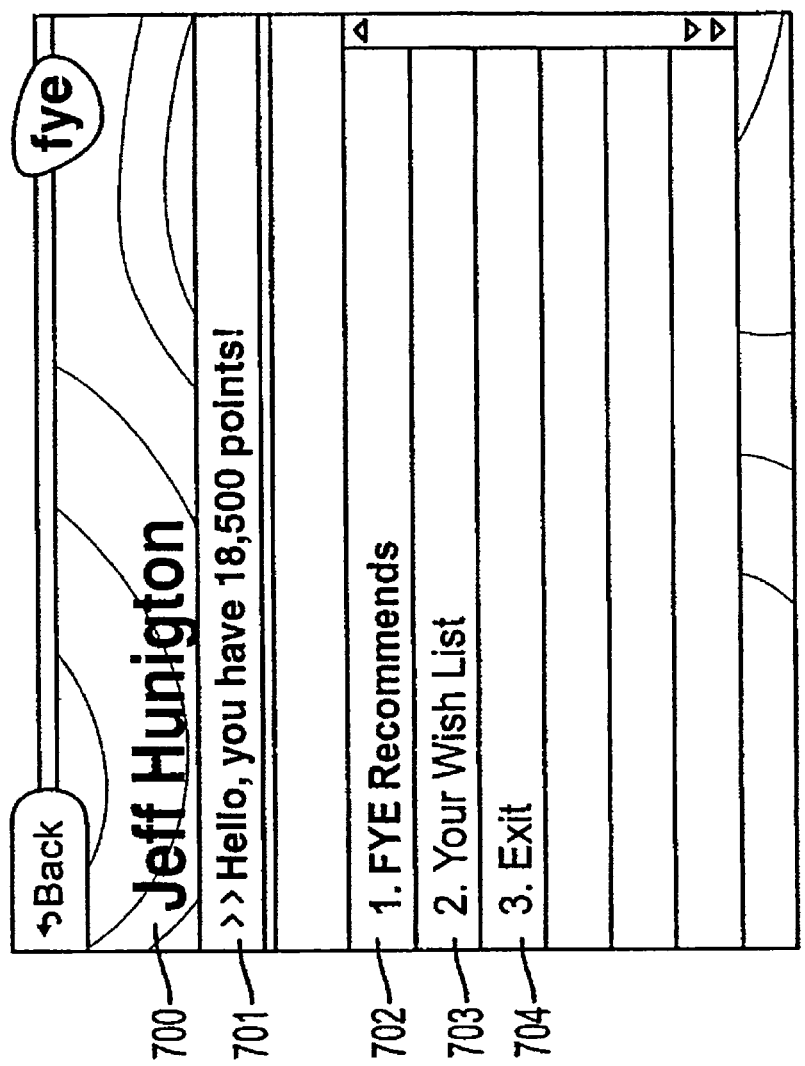

As shown in FIG. 7A, when a customer scans her Backstage Pass™ at an LVS device using the bar code scanner, the LVS device retrieves the customer's profile from storage and presents a personalized customer screen on the display. In this regard, the customer profile may be stored in the retail location's local database as well as the main database located at the merchant's headquarters, for faster access to the customer profile. However, the customer's Backstage Pass™ may be used at any retail location of the merchant by virtue of the distributed communication network allowing any retail location's servers to request customer profile data from the main database.

Figure 7C:
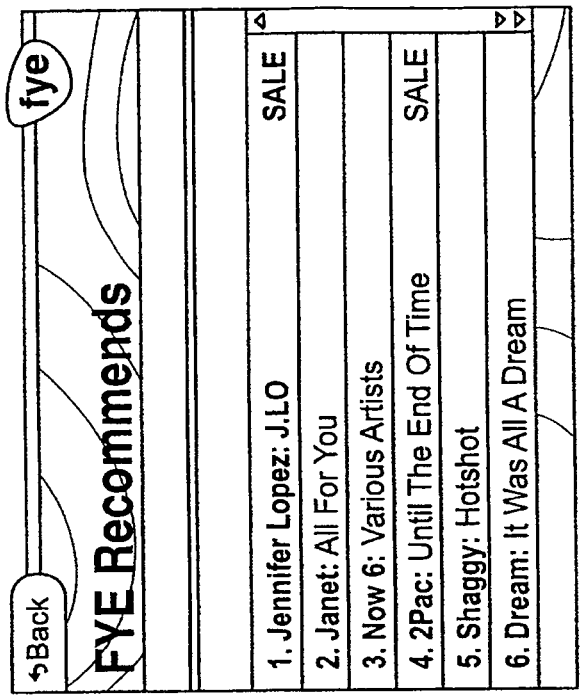
Figure 7B:
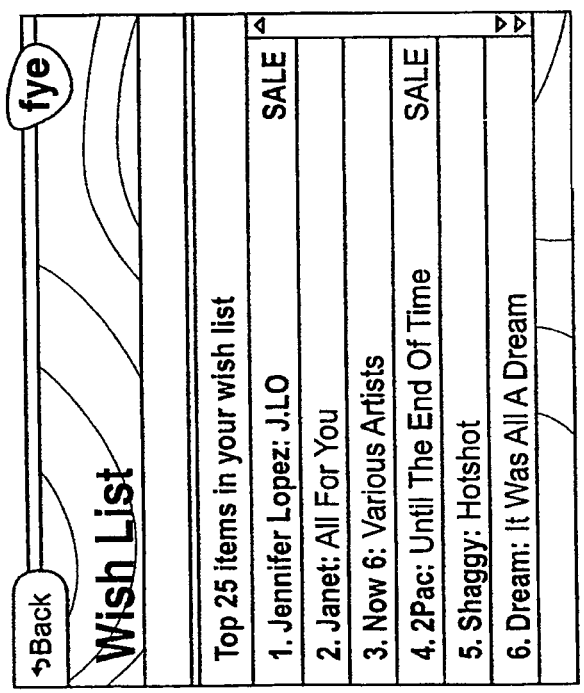

The personalized screen includes the customer's name 700. Additionally, the customer is informed of his bonus point total in display area 701. Using the navigation buttons, the customer may select a merchant recommendation list 702 or the customer's wish list 703. When the customer has completed review of his customer profile lists, the customer may exit to the default screen by selecting the exit command 704. FIG. 7B is an example of a customer wish list screen, and FIG. 7C is an example of a merchant recommendation screen.

Figures 8A, 8B:
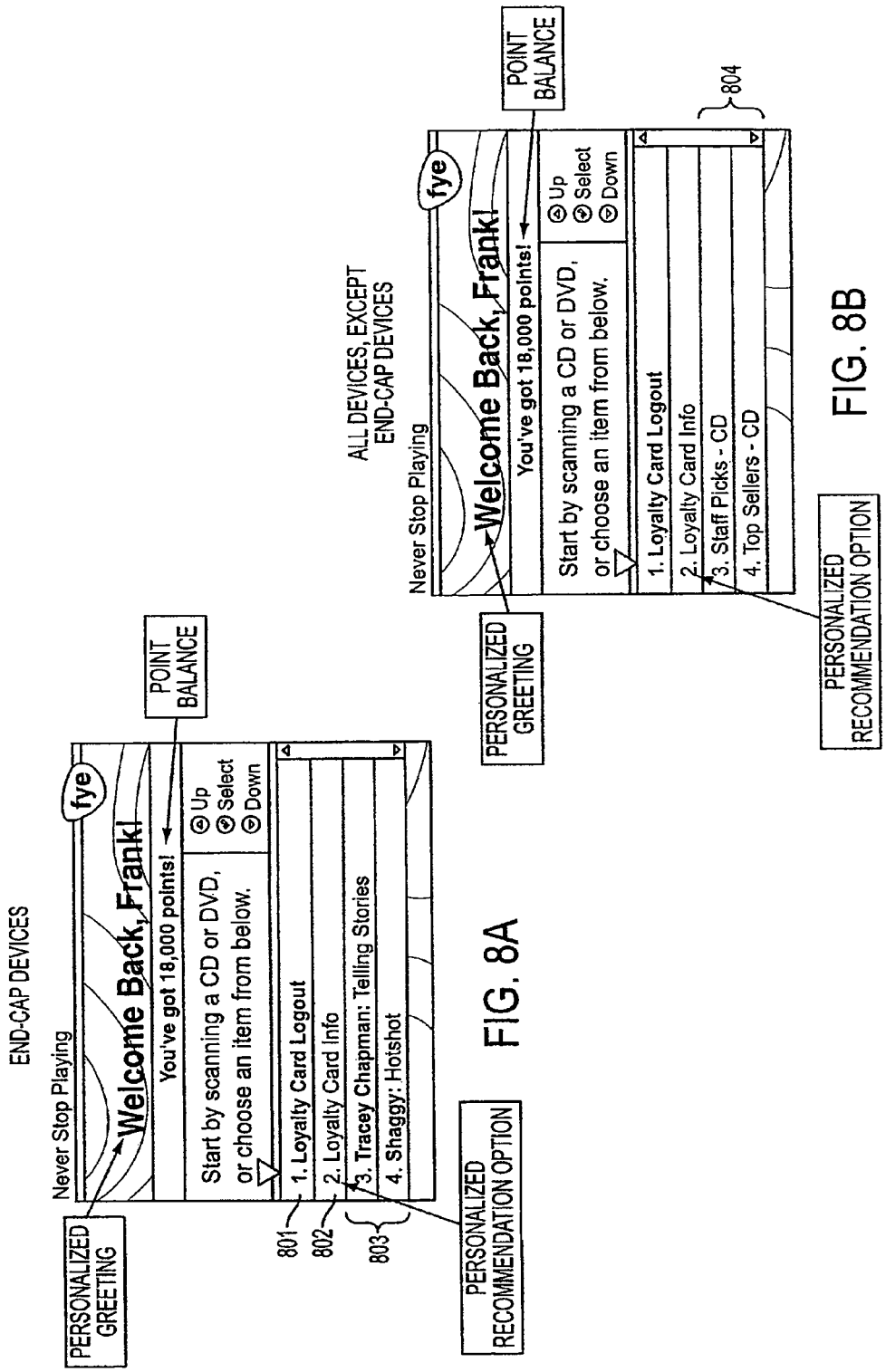
FIGS. 8A and 8B are screen shots of personalized customer display screens of the LVS according to one embodiment of the present invention.

FIG. 8A shows a customer personalization screen display for an end-cap LVS device, and FIG. 8B shows a customer personalization screen for other LVS devices, such as in-aisle LVS devices. Items 803 designate specific products corresponding to the location of the end-cap LVS, while items 804 designate associate (staff) picks and best selling products, respectively.

Item 801 is a customer personalization (or Loyalty Card) logout command. Selection of this item by the customer logs the customer out of the system, such that no personalized information is thereafter displayed and the customer cannot add items to his wish list. Item 802 is a Loyalty Card information command. Selection of this item causes a screen such as FIG. 7A to be displayed, from which the customer may obtain a personalized recommendation list, or may review his wish list. The customer can add, delete or change items in the customer's wish list in a number of different ways. For example, the customer may scan his customer personalization or loyalty card at a kiosk 12022 in a retail location. The kiosk is a device that is similar in functionality to an LVS device, except the kiosk includes an alphanumeric keyboard for entering textual information. The customer alternatively may log on to the merchant's Internet website through a personal computer, using the customer identification number. Additionally, the customer may use the LVS to edit wish list information.

For example, when the customer's wish list is displayed, such as shown in FIG. 7B, the customer may scan the bar code of a product that the customer desires to add to the wish list. If the customer desires to substitute an item in the wish list, the customer may highlight the item desired to be removed by using the navigation buttons, and then may scan the bar code of the item desired to be added to the wish list. In this manner, the scanned product will be substituted for the highlighted product. If the customer desires to simply remove an item from the wish list, the customer may highlight that item and then may actuate a predetermined button such as the "home" button or the "back" button in order to delete the highlighted item from the wish list.

The customer profile may be used by the system in many ways. The customer profile may inform the customer that an item on his wish list has been placed on sale; may recommend a new release by a certain artist whose prior product was previously purchased by the customer; may recommend titles within genres selected as preferences by the customer; may provide an inventory to the customer of all the customer's past purchases, thereby creating a catalog of all of the customer's owned titles. The customer profile may be used to reward the customer for frequent purchases through the use of the bonus points program. The customer profile also may be used to develop customer loyalty by presenting the customer with special gifts or offers at selected times. For example, if the customer enters her birth date into the profile, the system may present a gift to the customer if the customer scans her loyalty card at a retail location on her birthday. Such gift may be a percentage discount, a free promotional CD, a buy-specific-quantity-get-specific-quantity-free offer, or other type of gift.

Additionally, special offers may be presented to customers who scan their loyalty cards at random times, thereby further incentivizing customers to frequent the merchant's retail locations. Special discounts may be offered to logged-in customers on selected titles in the customer's wish list or in associates' recommendation lists.

An important feature of the LVS devices is that they can be configured according to their specific locational placement in the retail site to maximize sales promotion. For example, end-cap LVS devices can be used as attractants to encourage customers to browse specific aisles. Hit wall LVS devices can be used to promote top selling product items by featuring those items in their default screens.

Figure 9A:
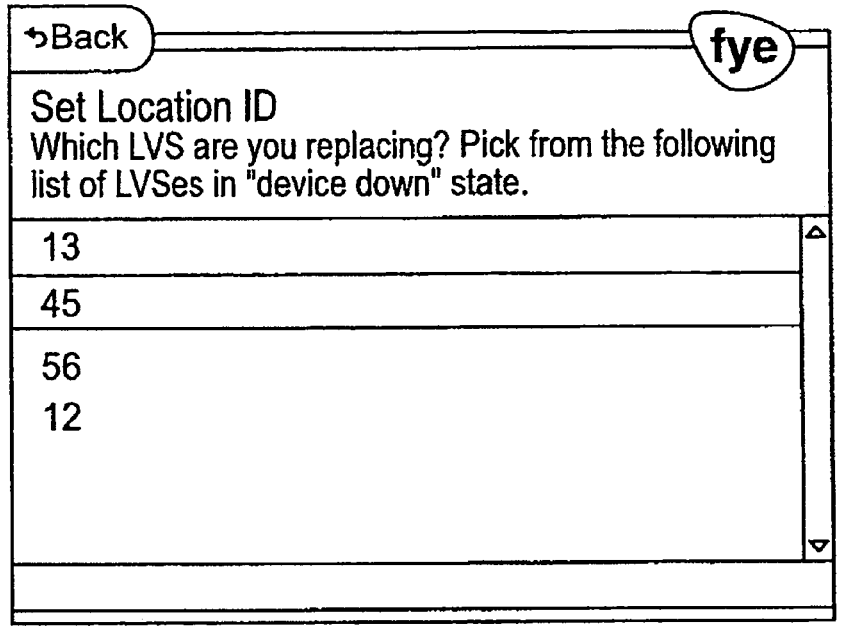
FIGS. 9A-9H are screen shots of a configuration procedure for an LVS according to one embodiment of the present invention.

FIGS. 9A-9H illustrate a procedure for configuring an LVS device. As shown in FIG. 9A, when an LVS device is first plugged into a mounting bracket using a standard network wire connector, such as an RJ45 connector which provides both power and data connections, a "Set Location ID" screen is displayed. Each predetermined LVS location in the retail site is given an identifying number, which preferably is labeled on the mounting bracket. The installer highlights the location number on the screen corresponding to the number on the mounting bracket label, and presses the select button. Each LVS contains a processor having a unique identification code. Entering the location ID and pressing the select button causes the processor's identification code to be associated with the location ID for future communications with and data transmissions from the retail site's servers and routers.

Figure 9B:
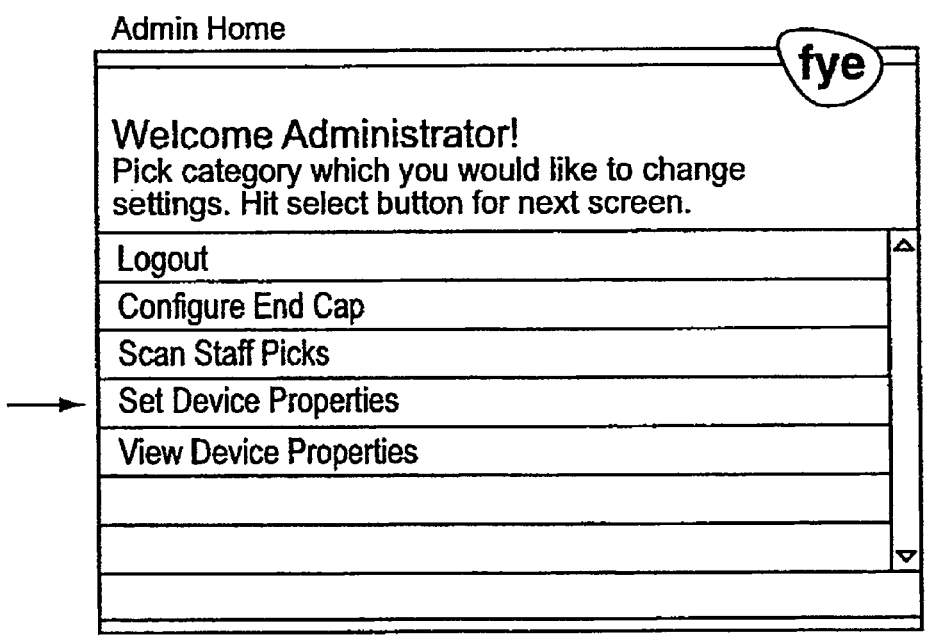
Figure 9C:
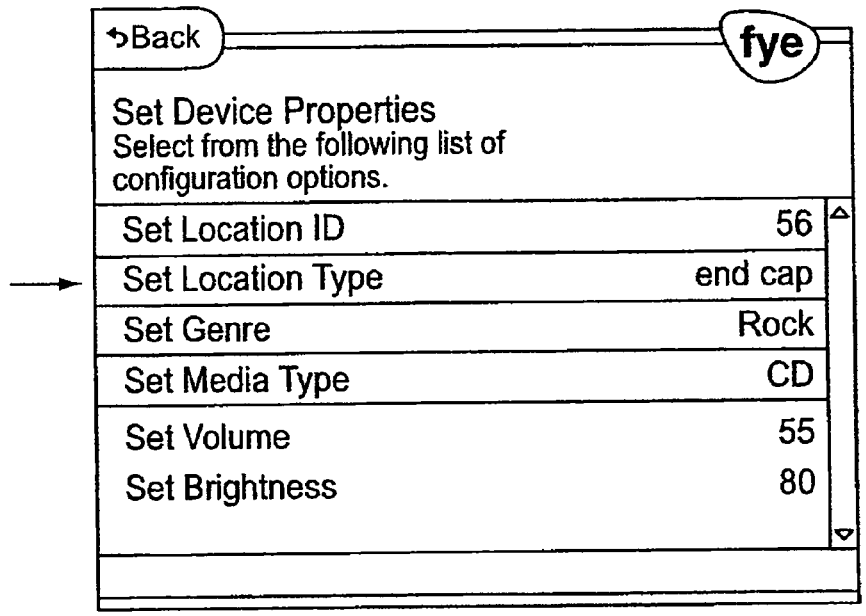
Figure 9D:
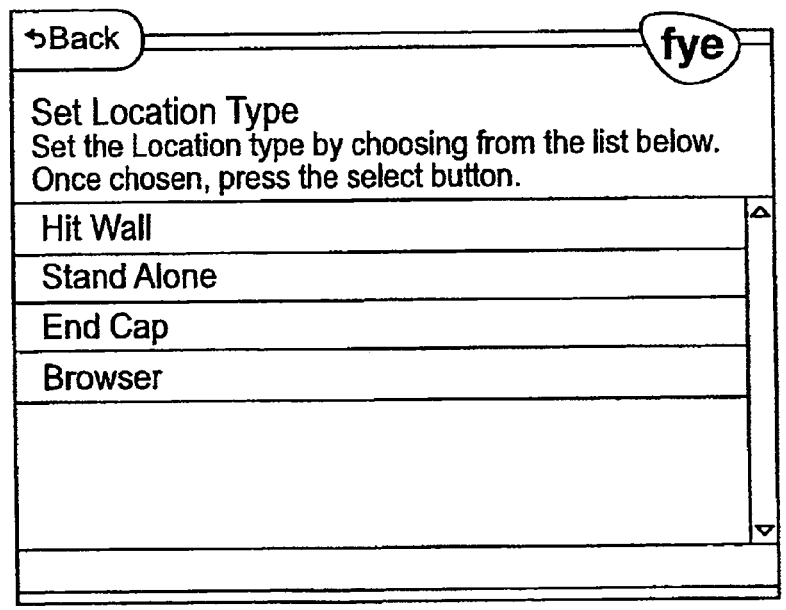
Figure 9E:
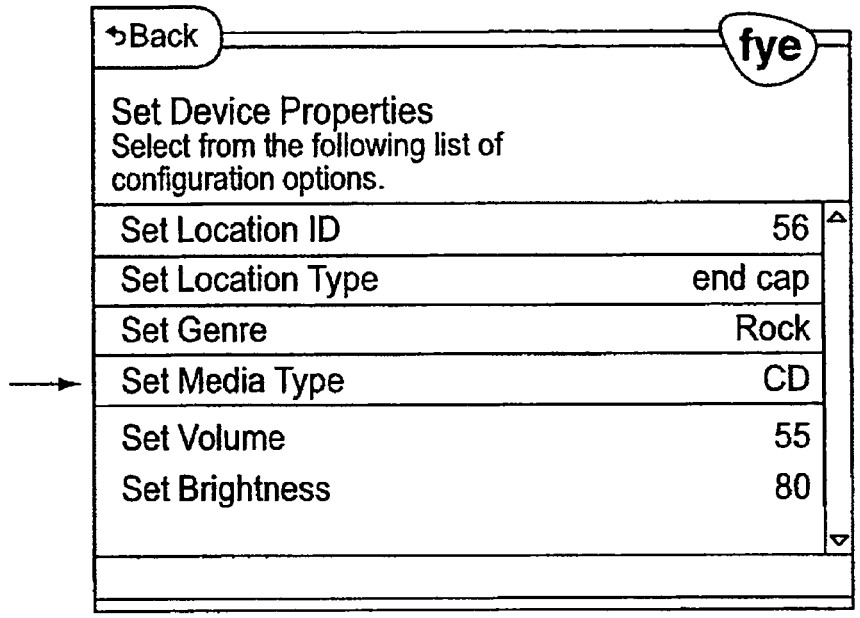
Figure 9F:
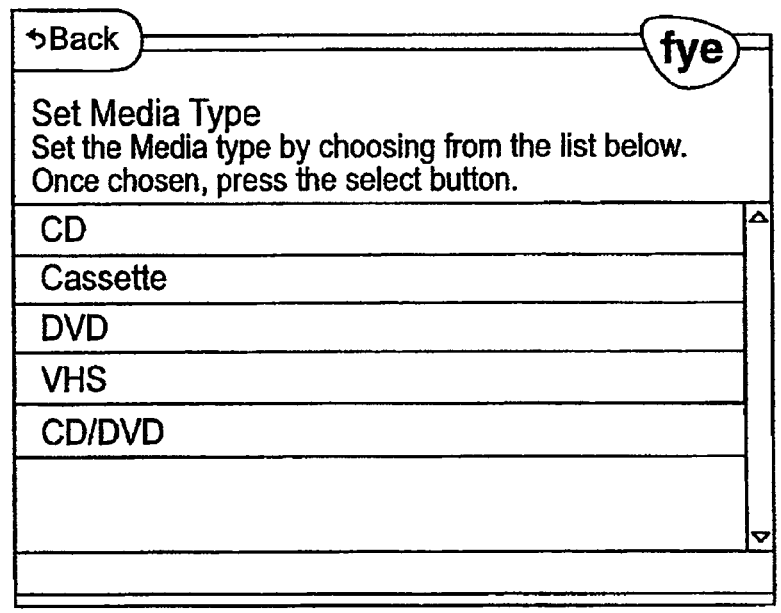
Figure 9G:
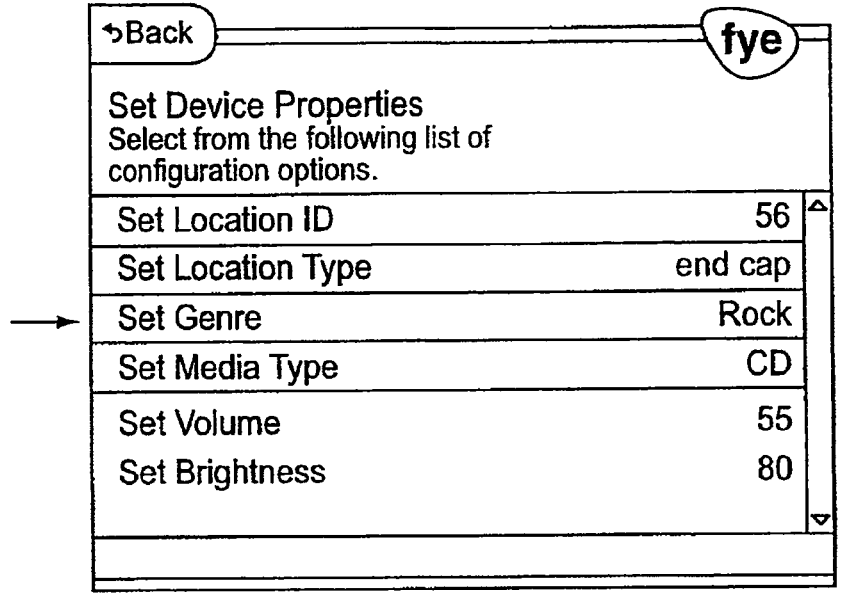
Figure 9H:
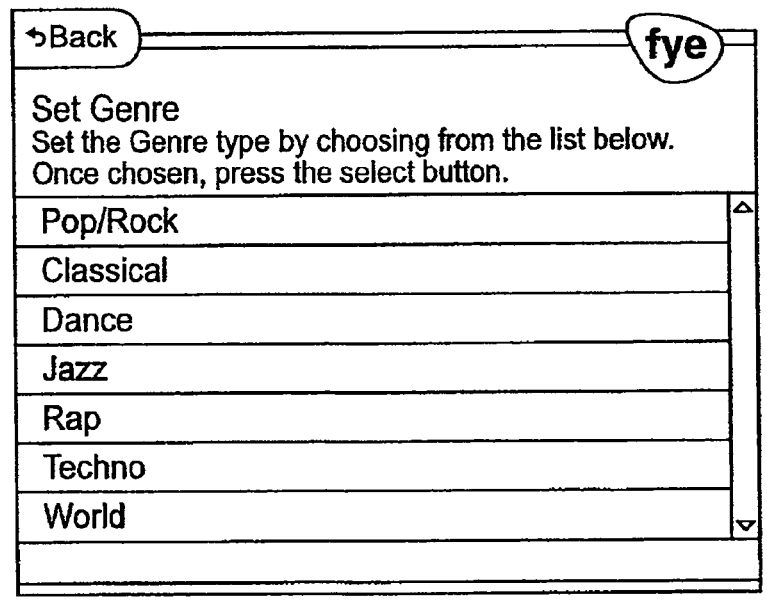

As shown in FIG. 9B, various administrative functions can be carried out by scanning an administrator bar code into the LVS. Upon reading a valid administrator code, the screen of FIG. 9B is displayed. Among the properties of the LVS that can be specified, the location type associated with the location ID can be set and also changed using the LVS functionality. To set or change the location type, the user selects the "Set Device Properties" item in the screen. As shown in FIG. 9C, among the properties of the LVS device that can be modified are the location type, genre, media type, volume, and brightness. As shown in FIG. 9D, the different location types that may be set include Hit Wall, Stand Alone, End Cap, and Browser (in aisle). The specific property desired is highlighted and selected in order to set it for the associated LVS device. To set media type, as shown in FIG. 9E, the media type item is selected, which causes the screen shown in FIG. 9F to be displayed. Media types including CD, cassette, DVD, and VHS can be selected as being supported by the particular LVS device. For example, the set media type can be used to determine the content of the default media presentation loop played by the LVS device when not being used by a customer. Multiple media types can be selected, except for certain LVS device location such as browser (in-aisle) locations, where products are grouped according to media type (such as CDS). Such LVS devices should be configured to support only the product media type in the vicinity of the LVS device. In addition to media type, the genre of default product promotional content loops can be selected, as shown in FIGS. 9G and 9H. As illustrated, genres such as pop/rock, classical, dance, jazz, rap, techno, and world may be designated as being supported by the LVS device.

Figure 11A:
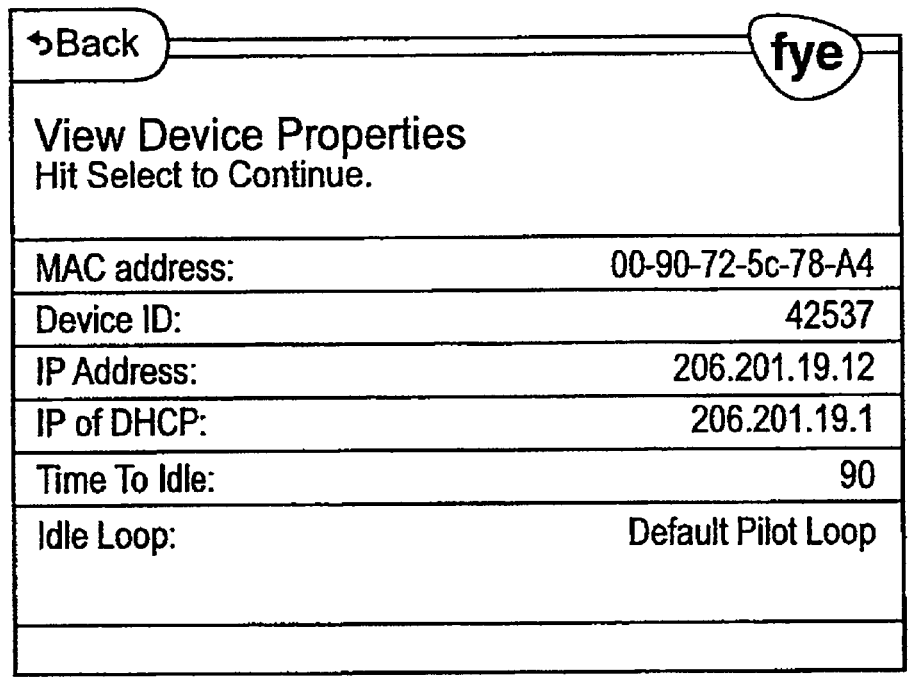
FIGS. 11A-11D and 12A-12C are screen shots of procedures for viewing and adjusting LVS device properties according to one embodiment of the present invention.
Figure 11B:
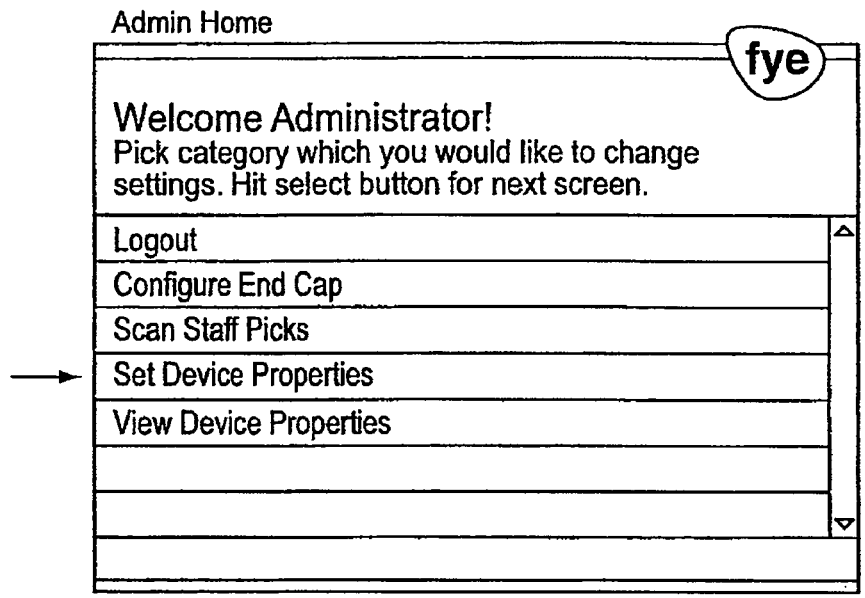
Figure 11C:
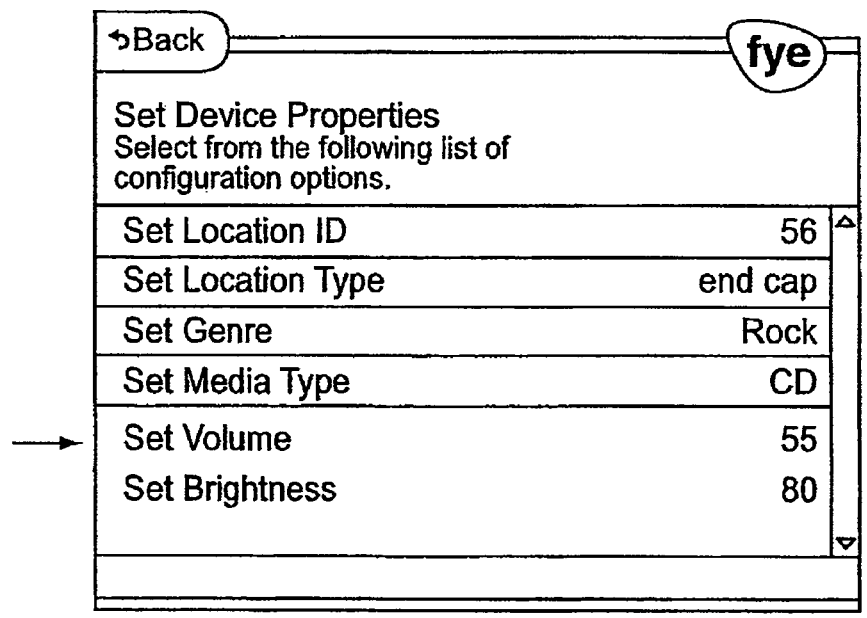
Figure 11D:
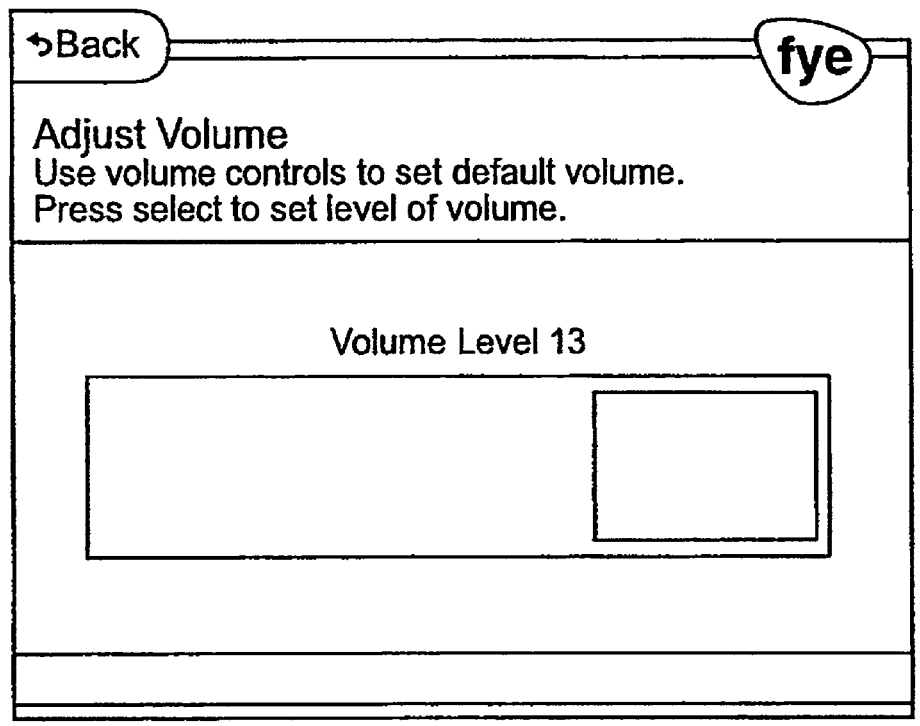

Device properties of an installed and operational LVS may be viewed by an administrator, as shown in FIG. 11A. Each LVS has a MAC address, a device ID, and an IP address. In addition, the properties displayed include the IP of the DHCP (Dynamic Host Configuration Protocol), the time-to-idle (indicating how much time must elapse subsequent to the last customer interaction before playing a default content loop), and the identity of the idle loop to be played. FIGS. 11B-11D illustrate the sequence required to adjust the default volume of the LVS, which can be strategically set according to location to provide maximum promotional benefits. As shown in FIG. 11D, the volume setting screen may represent volume in terms of a sliding bar graph to assist the administrator in choosing the optimal default volume.

Figure 12A:
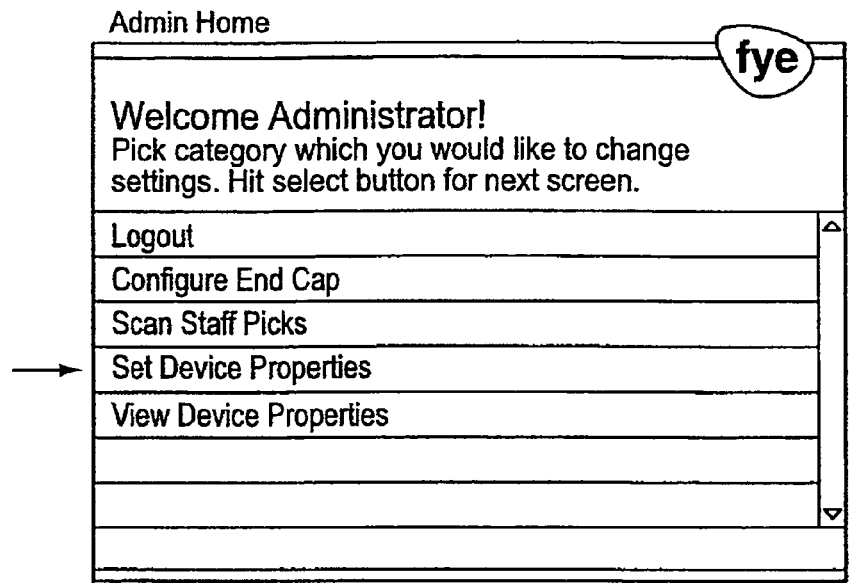
Figure 12B:
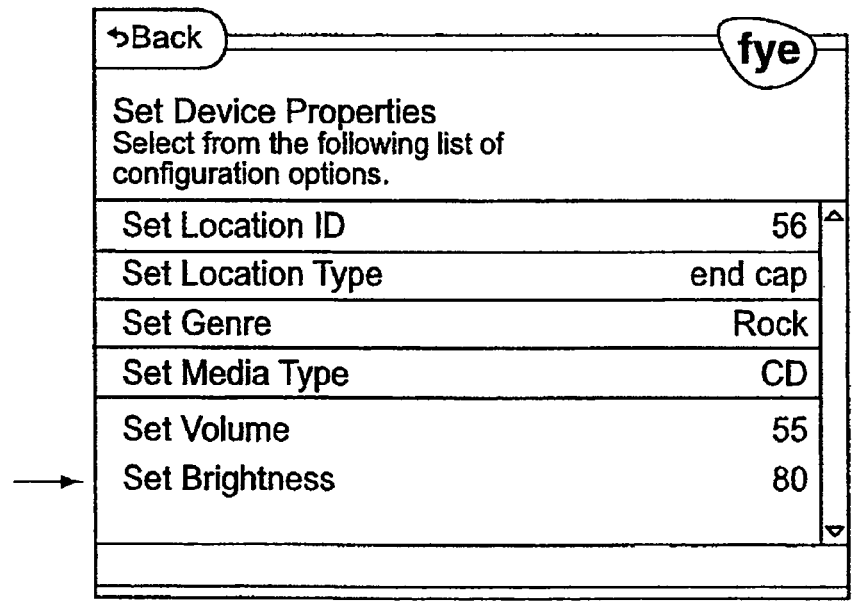
Figure 12C:
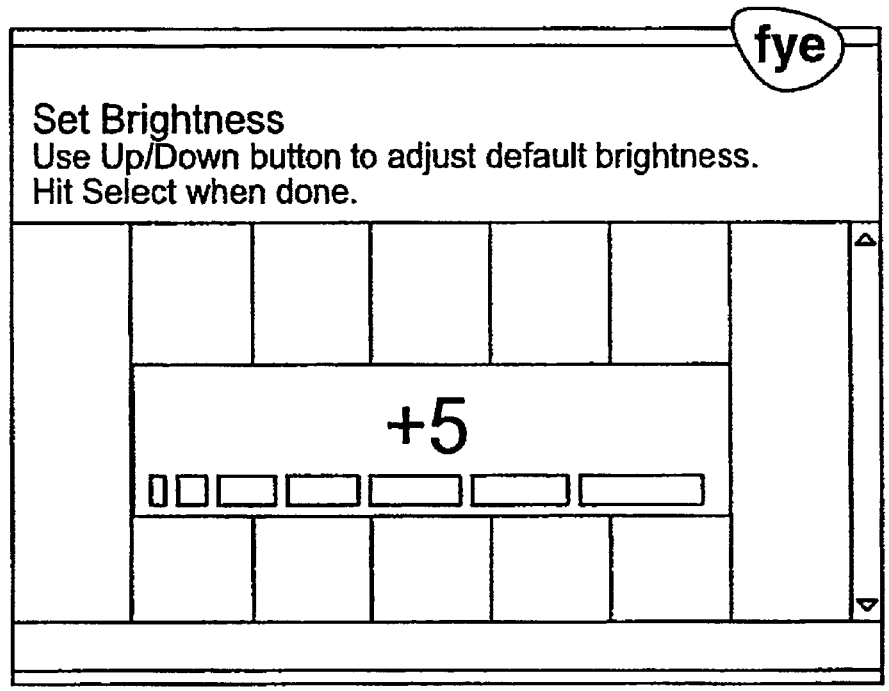

Similarly, FIGS. 12A-12C illustrate the sequence for adjusting the display brightness of the display screen, which again may vary as a function of the specific location of the LVS within the store in order to provide maximum attractant value.

Another significant feature of the present invention relates to the ability for sales associates to input their personal favorites into the system as "associate picks" or "staff recommendations." Sales associates frequently have specialized insight into the preferences and tastes of customers who typically are their peers, and thus allowing sales staff to provide general recommendations within product genres provides a valuable sales tool that serves as an additional attractant for customers to use the LVS to sample merchandise for purchase.

Figure 10A:
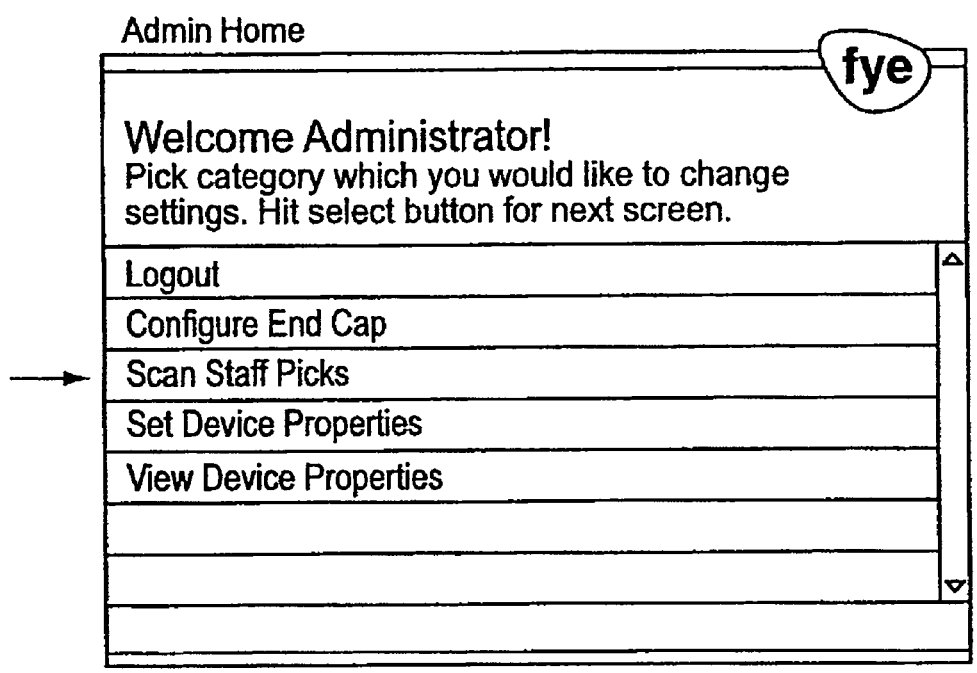
FIGS. 10A-10D are screen shots of a procedure for inputting sales associate recommendations into a database using the LVS, according to one embodiment of the present invention.
Figure 10B:
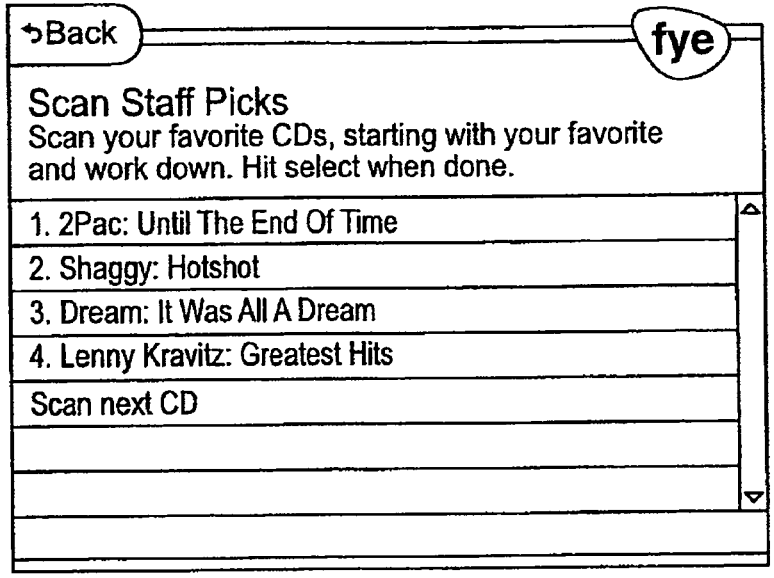
Figure 10C:
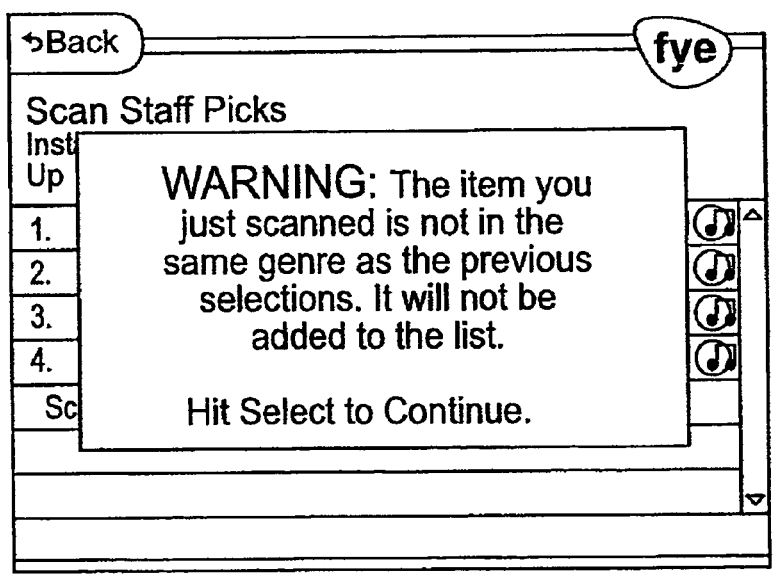
Figure 10D:
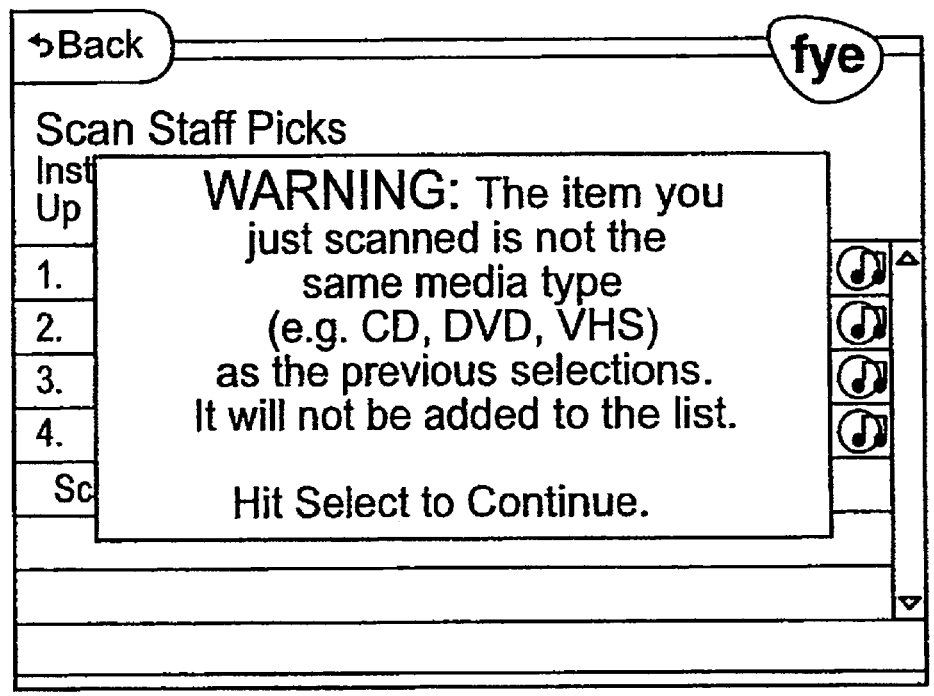

FIGS. 10A-10D illustrate a sequence of display screens that allow sales associates to enter personal recommendations into the system. FIG. 10A shows an administrator screen including a "Scan Staff Picks" item, which is highlighted and selected by a sales associate after scanning the associate's administrator bar code ID. After the "Scan Staff Picks" has been selected, the associate scans the bar code of the first item (i.e., CD) into the LVS. This initial scan sets the genre and media type for the associate recommendation session. To enter additional recommendations, the associate highlights and selects the "Scan next CD" item as shown in FIG. 10B, and then scans the bar code of the next product item. Subsequent product item scans must match the set genre and media type, otherwise they will be rejected and error messages as shown in FIGS. 10C (wrong genre) and 10D (wrong media type) will be displayed. By virtue of the network connection to real-time inventory data, the system has the ability to override any individual associate pick and prevent it from being displayed if the recommended item is not in stock at the retail site and/or capable of being ordered for fulfillment by the warehouse.

Operation of the sampling, recommendation and purchase system according to the present invention will now be explained with reference to the process flow diagrams of FIGS. 13-16.

Figure 13:
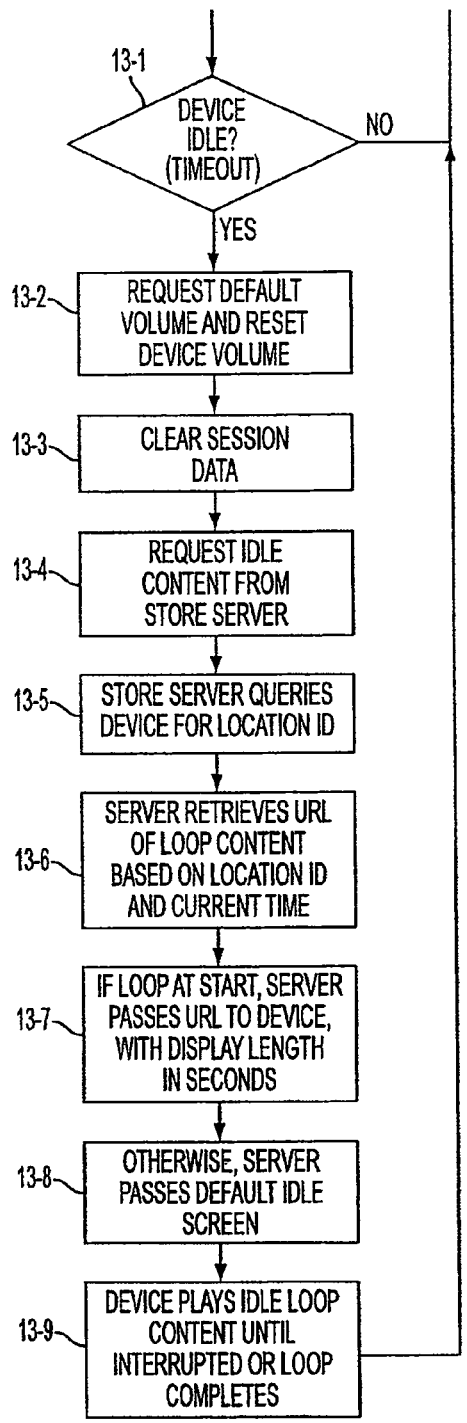
FIG. 13 is a flow diagram of a procedure for retrieving and playing an idle loop content file at an LVS according to one embodiment of the present invention.

FIG. 13 is a flow diagram of a procedure for playing an idle loop on an LVS device. At step 13-1, a timer is checked to determine whether the LVS is idle. The timer may be internal to the LVS, and is reset each time a function button of the LVS is pressed. Alternatively, the timer may be located in the store's media server, and would be reset each time a communication signal is sent from the LVS. As shown in FIG. 11A, each LVS has a set "time-to-idle" representing the amount of time that must elapse during which no customer activity occurs, before an idle loop starts playing.

If the LVS device is determined to be idle, at step 13-2, the stored default volume is requested, and the LVS's volume is reset to the default value. At step 13-3, any current session data (e.g., customer information, event information, session start time) loaded into the LVS's memory is cleared. At step 13-4, the LVS sends a request for idle loop content to the store server. All idle loops are synchronized throughout the store against the server clock and are run continuously from a predetermined initial time, such as midnight. At step 13-5, the server retrieves the location ID of the requesting LVS, and at step 13-6, the store server retrieves the URL of the loop content for the requesting LVS, based on the LVS's location and the current time (different idle loops may be programmed to play on the LVS depending on the time of day). From the running length of the loop as determined from the retrieved loop information, the current time and the known initialization synchronization time, it is determined what segment of the idle loop should be playing at the current time. If it is determined at step 13-7 that the idle loop is at the beginning of the loop, the store server passes the URL of the loop to the LVS device, with the running (display) length in seconds. If the loop is in mid-segment, at step 13-8 the server passes the default idle screen (such as, e.g., the store logo) to the LVS to be displayed until the start of the current idle loop is reached. At step 13-9, the LVS device requests the idle loop content by sending out the URL, downloads it and plays it on the screen, until either the occurrence of an interrupt (such as scanning of a bar code or pressing a function button) or until the loop completes. The process then returns to step 13-1 to begin the sequence again.

Figure 14:
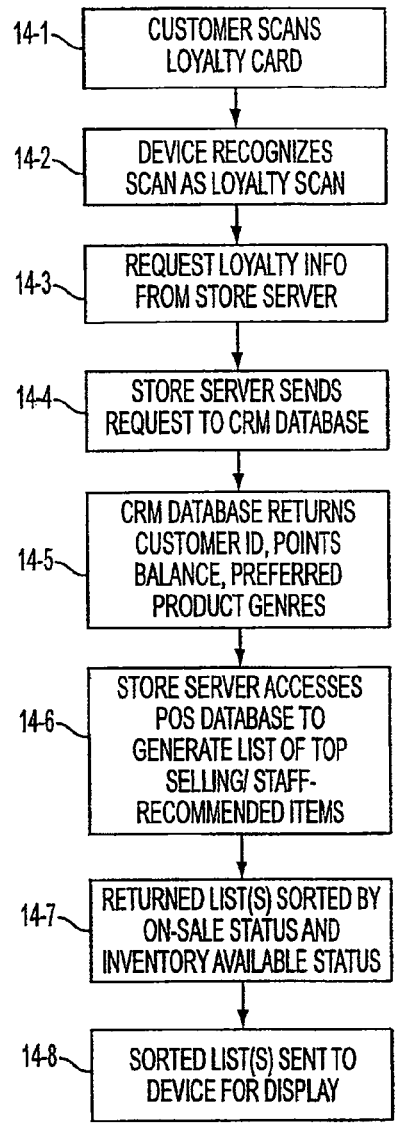
FIG. 14 is a flow diagram of a procedure for customer log-in at an LVS according to one embodiment of the present invention.

FIG. 14 is a flow diagram of a customer log-in. At step 14-1, a customer scans her Backstage Pass™ or customer loyalty card across the bar code reader of the LVS. At step 14-2, the LVS recognizes the bar code as a loyalty scan, and at step 14-3, requests customer profile data from the store server.

At step 14-4, the store server sends a request for the customer profile data to the central Customer Relationship Management (CRM) database (1801 of FIG. 1) (the store server may first check its local database or cache memory to see if the customers profile is already stored locally). At step 14-5, the CRM database 1801 returns the customer identification (name), bonus points balance, and preferred product genres to the store server. Other optional information such as the customer's birth date, etc. also may be returned to the store server.

At step 14-6, in response to the receipt of the customer profile information, the store server accesses the POS database to generate lists of top selling items and sales associate recommendations based on the indicated preferences in the customer's profile. As discussed above, the top selling products may represent sales over all of the retail merchant's locations, sales in just the local retail location, or national sales numbers retrieved from a third party. The merchant sales data can be downloaded to all store servers in a batch process from the central database; national sales numbers may be retrieved from third party providers, and the local sales numbers may be generated from the POS records.

At step 14-7, the returned lists from the POS database are sorted by their on-sale status and inventory available status, and at step 14-8 the sorted lists are sent to the LVS for display when selected by the customer.

Figure 15:
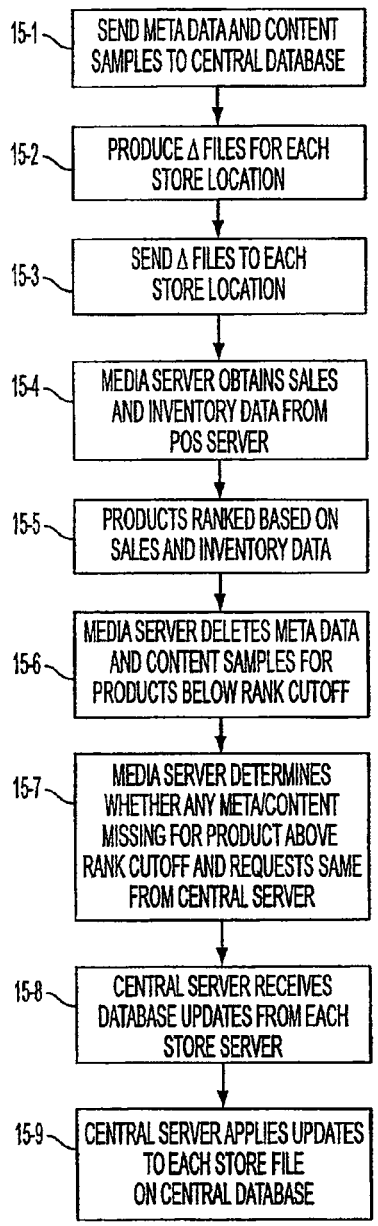
FIG. 15 is a flow diagram of a procedure for loading and updating meta data and content files to retail locations according to one embodiment of the present invention.

FIG. 15 is a flow diagram of the process for retrieving and updating meta data and sample content for the system. At step 15-1, initial downloads of meta data and content samples for all UPCs (Universal Product Code) actively carried by the merchant are sent from the respective third party providers to the merchant's central database. After the initial download, step 15-1 would represent automatic periodic (i.e., weekly) updates sent to the central database to keep the merchant's content sample inventory consistent with the products in the merchant's stores.

At step 15-2, delta files are produced by the central server (e.g., by the media/content distribution-to-store batch process 1400) for each store location. The delta files contain meta data and content samples received in the download of step 15-1, which do not appear in a record of the meta data and content samples contained at each store location. At step 15-3 the delta files are sent to each store location from the central server.

At step 15-4, the media server of each store location obtains sales and inventory data from the store's POS server, and at step 15-5, the media server ranks products according to sales and inventory data. At step 15-6, the media server deletes stored meta data and content samples for products below a predetermined rank cutoff number.

At step 15-7, the media server compares the ranked product list against the stored meta data and content samples contained in the local database, and determines whether any meta data and/or sample content that should be present in the local database is not present, and requests such data from the central server for download, and downloads the missing data.

After the media server determines that all meta data and sample content data which should be stored locally is stored locally, the media server at step 15-8. generates a database update file identifying all changes to the content of the local database from the last update, and transmits the database update file to the central server. At step 15-9, the central server applies the database update files from each store location to each store file in the central database, so as to maintain an accurate list of all meta data and sample content maintained by each store location. All updated sample data is "date aware;" in other words, updated sample data may be transmitted before the release date of a product, and will not be made available for sampling until the product has been released and is in stock. Alternatively, advance promotional campaigns may be implemented wherein customers are allowed to pre-sample upcoming releases and may pre-order the product before its release date.

Each LVS sampling station may be shut down by the in-store server upon detection of POS terminal logout for all POS terminals in the store. The in-store server typically would wait for a predetermined period of time to elapse after the last POS terminal was logged out, and then would proceed to shut down all sampling stations automatically, thereby eliminating the need for store personnel to manually shut down all stations. Additionally, the operating status of the sampling stations can be: monitored by a watchdog timer provided in the store server, which periodically "pings" each sampling station and waits to receive an acknowledgment response signal. In the absence of such response signal, the non-responding station may be re-booted automatically. Additionally, each administrator identification bar code card contains a reboot code. Consequently, a system administrator may reboot a frozen sampling station in the retail location simply by scanning the reboot bar code into the sampling station.

Figure 16:
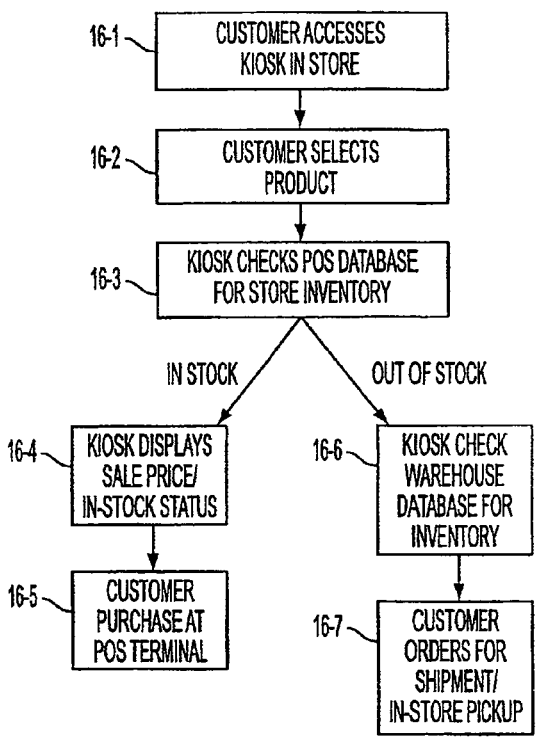
FIG. 16 is a flow diagram of an in-store customer purchase procedure according to one embodiment of the present invention.

FIG. 16 is a flow diagram of a procedure for purchasing product using the system of the present invention. As previously explained, in addition to LVS devices, each store may have a stand alone kiosk. The kiosk typically includes the same functionality of the LVS with respect to sampling and customer personalization interactions, and additionally includes a keyboard and limited Internet browser capability to allow a customer to place orders and carry out certain additional functions, such as updating the customer's personal profile. The Internet browser capability also enables the kiosk to be used as a search engine for product sold by the merchant.

At step 16-1, the customer accesses a kiosk, and at step 16-2, the customer selects a particular product for preview, such as by selecting a product in a top seller list, associate recommendation list, wish list, search result list or from an online catalog. At step 16-3, the kiosk queries the local POS database to determine whether the selected product is in stock locally. If the product is in stock, at step 16-4 the kiosk displays the current sale price and in-stock status of the selected product to the customer. At step 16-5, the customer purchases the product at a POS terminal.

In this regard, the kiosk may accept an input from the customer indicating that the customer desires to purchase the selected product. The kiosk may then send a message to a pre-designated sales associate/POS terminal identifying the product desired by the customer. The sales associate may then retrieve the product from the store's inventory and have it waiting at the POS terminal for the customer to complete the purchase transaction. If the customer has logged-in using the loyalty card, the transaction can be stored in the customer's profile. It also may be possible for the customer's profile to include credit card information, such that the purchase transaction may be automatically completed by the customer at the kiosk simply by pressing or clicking on a displayed icon. The customer then can go to a designated POS terminal or other location in the store and simply pick up the product purchased by presenting the loyalty card or other identification.

If the kiosk determines that the desired product is not in stock locally, at step 16-6 the kiosk checks the central warehouse (1600, FIG. 1) to determine whether the product is in stock at the warehouse, as indicated by the contents of the warehouse database 1601. If the product is contained at the central warehouse, at step 16-7 the customer may place an order for the product using the kiosk. The order may be shipped to a location of the customer's choice, or may be shipped to the store for pickup. Alternatively, if the kiosk determines at step 16-6 that the product is not contained in the central warehouse and that the merchant does not carry the requested product, the kiosk still may accept an order for the product and transmit the order to a third party order fulfillment provider 1501 (FIG. 1).

According to an additional feature of the invention, an IM tab server 1108 (FIG. 1) is provided, such that a customer logged in to the net server or Passport™ server may transmit product information to a receiving party with whom the customer may be engaged with in an instant messaging window. The instant messaging window may include a special tab that the customer may select, and which allows the customer to send to the receiving party a particular music or video sample, the customer's stored wish list, or graphical data pertaining to a particular product that the customer wishes to make known to the receiving party.

Figure 17:
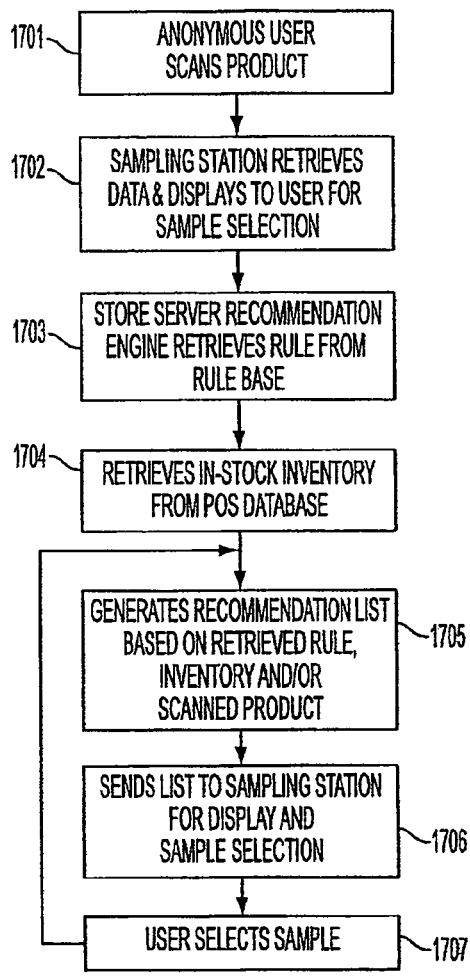
FIG. 17 is a flow diagram of a process for generating a recommendation to be displayed to an anonymous user of an LVS according to one embodiment of the present invention.

According to a further aspect of the invention, product recommendations are generated for presentation to anonymous users of the sampling stations based on product scanned by the user and the real-time POS inventory database, in conjunction with a rule-based recommendation engine running on the store server. As shown in FIG. 17, at step 1701 an anonymous user scans a product barcode into the sampling station to retrieve samples for playback. The sampling station at step 1702 sends the scanned-in barcode to the store server to retrieve from the database the meta data and sample data to be presented to the user. Thus, the user may select particular content for playback at the sample station.

At step 1703, the store server recommendation engine retrieves a recommendation rule from a stored rule base. At step 1704, the engine retrieves in-stock inventory data from the POS database. The recommendation engine then generates a recommendation list of products at step 1705, based on the retrieved rule from the rule base, the in-stock inventory data, and the scanned product information. The recommendation rule can use any of these parameters, all of the parameters, or none of the parameters to generate the recommendation list. Under most circumstances, however, the recommendation rule would restrict recommendations to products in-stock, so that the user would be able to purchase the product immediately if desired as a result of receiving the sample data.

At step 1706, the engine sends the generated recommendation list to the sampling station, where it is displayed to the user for the user to select particular products to be sampled from the list. At step 1707, the user selects a particular product sample, which is then played back to the user. Once the recommended product has been selected, the identification information for the selected product can be sent back to the recommendation engine to generate another recommendation list based on the selected product. This process can be repeated indefinitely. If the user fails to select a particular sample, a sample may be played to the user automatically by the station (i.e. passively).

Figure 18:
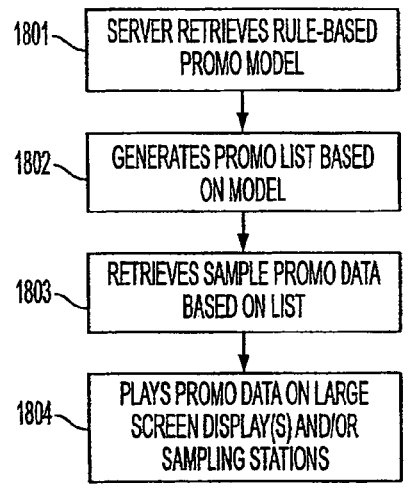
FIG. 18 is a flow diagram of a process for generation a promotional in-store presentation using a rule-based model according to one embodiment of the present invention.

In addition to providing individualized recommendations at sampling stations, the present invention further enables store-wide multimedia promotion presentations to be generated in accordance with a rule-based promotion model stored in a rule base. The rule base may be stored on the store server, or appropriate rules may be retrieved from the central server as needed or "pushed" by the central server. As shown in FIG. 18, at step 1801 the store server retrieves a rule-base promotion model, which contains predefined rules that determine the multimedia presentation to be presented store-wide. The presentation may be presented on the large screen display panels provided in the store; alternatively, the presentation may be presented on all individual sampling stations simultaneously.

At step 1802, the server generates a promotion list containing the identity of products to be promoted store-wide as a result of the retrieved rule. At step 1803, the server retrieves promotion sample data as specified in the list, and at step 1804 the server plays the promotion sample data, either on the large screen displays and/or on each of the individual sampling stations simultaneously.

Figure 19:
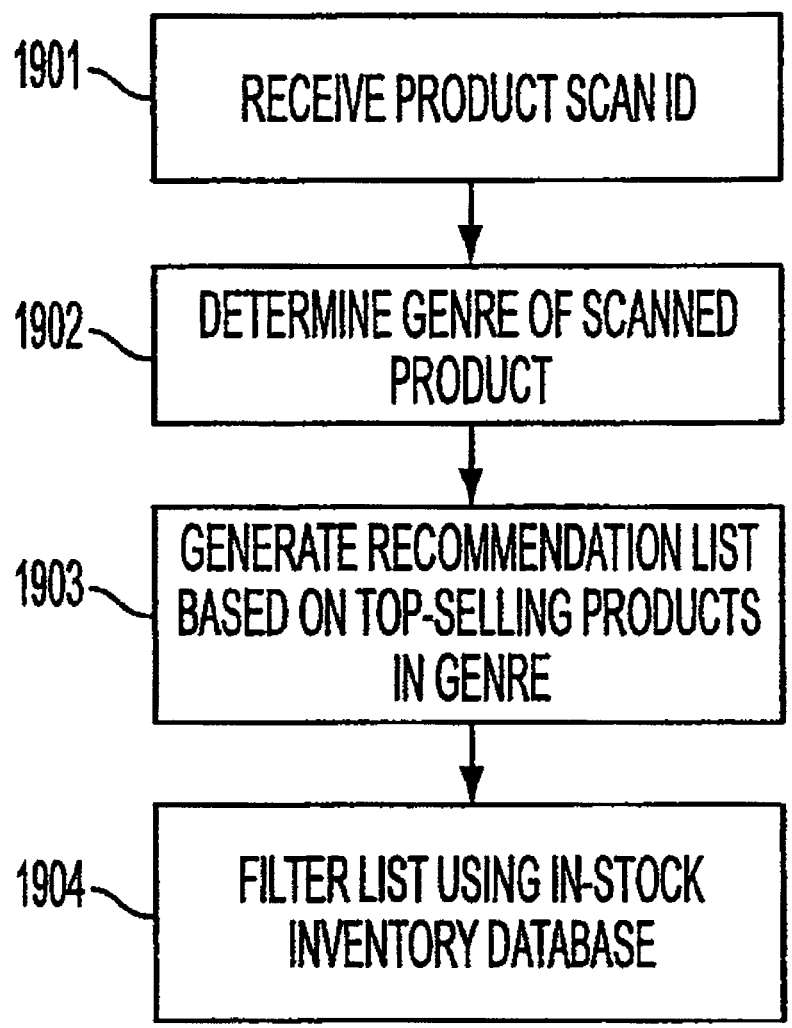
FIG. 19 is a flow diagram of an example rule for generating a recommendation according to one embodiment of the present invention.

FIG. 19 shows one example of a recommendation rule according to the invention. This example is provided for purposes of explanation only—the number of different recommendation rules capable of being created is unlimited.

According to the example, after a scanned product ID is received at step 1901, the genre of the product is determined (e.g., hard rock CD, action-comedy DVD, etc.) At step 1903, a recommendation list is generated based on the top-selling products in the genre, as determined from a source such as the in-store POS database, the central server of the merchant, national sales figures from an independent party, etc. In addition to genre, the recommendation may be based on similar sounding artists, movies starring the same actors, etc.) At step 1904, the generated recommendation list is filtered using the in-stock inventory database of the retail location, whereby titles on the recommendation list which are not in stock in the store will be removed from the recommendation list to generate a final recommendation list to be sent to the sampling station.

Figure 20:
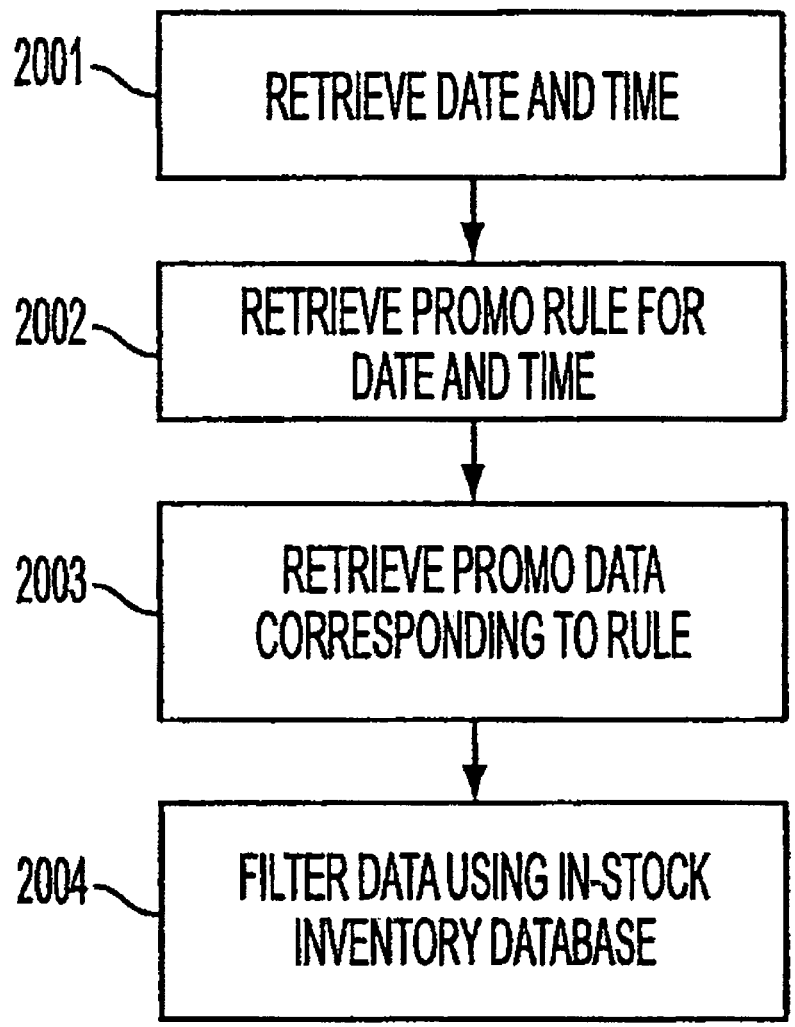
FIG. 20 is a flow diagram of an example rule for generating an in-store promotional presentation according to one embodiment of the present invention.

FIG. 20 shows one example of a store-wide promotional model rule according to the invention. Again, the example is provided for purposes of illustration only, as the potential number of different promotional rules that can be created is unlimited. At step 2001, the store server retrieves the current date (i.e., date and day of the week) and the current time. At step 2002, the server retrieves a promotional rule from a stored rule base corresponding to the current date and time. For instance, if it is 4 p.m. on Friday, the promotional rule might be to advertise specific teen favorites, or products associated with a movie to be released on the weekend. However, if it is 2 p.m. on Sunday, the promotional rule might be advertise light jazz titles.

At step 2003, the promotional sample and meta data corresponding to the rule in effect is retrieved from the database, and at step 2004 the retrieved data is filtered according to the in-stock inventory database of the retail location, whereby titles on the recommendation list which are not in stock in the store will be removed from the recommendation list to generate a final recommendation list to be sent to the sampling station. The filtered data is then sent to the in-store display(s) for presentation to all customers in the store. In addition to promoting in-store stock items, the system may be used to promote merchandise and service tie-ins of other merchants. For example, where the retail location is a music and video store in a shopping mall, the system may advertise a movie playing at the mall, which has a soundtrack available on CD or a prequel available on DVD, or may advertise a discount available for certain products when a receipt from a food establishment or a clothing retailer is presented.

The invention having been described, it will be apparent to those skilled in the art that the same may be varied in many ways without departing from the spirit and scope of the invention. Any and all such modifications are intended to be included within the scope of the following claims.

What is claimed is:

1. A media sampling method, comprising:
    storing product content samples and product content information;
    disposing at a location within a retail site a sampling station, the sampling station being operable to enable a user to listen to and/or view one or more of the product content samples, and the sampling station comprising a display device, a bar code scanner, and a headphone;
    communicatively connecting the sampling station to a server located within the retail site via a network cable, the sampling station being configured to (a) receive all of its electrical power via the network cable and (b) use the network cable to transmit data to and receive data from the server;
    displaying on the display device a prompt prompting an administrator to configure the sampling station upon the sampling station being communicatively connected to the server via the network cable for the first time;
    storing in a point-of-sale (POS) database pricing information for products being sold at the retail site;
    automatically in response to the bar code scanner scanning a bar code of a product placed by the user adjacent to the bar code scanner, transmitting information encoded in the bar code to the server coupled to the POS database;
    in response to receiving the information at the server, using the information to retrieve from the POS database pricing information for the product;
    after retrieving the pricing information, transmitting the pricing information and product content information related to the product to the sampling station, wherein, upon receiving the pricing and product content information, the sampling station uses the display device to display the pricing and product content information to the user, wherein
    the step of prompting the administrator to configure the sampling station comprises displaying a user interface screen to the administrator that enables the administrator to assign a configuration parameter to the sampling station, and
    the configuration parameter is a location identifier identifying the location of the sampling station within the retail site.

2. The method of claim 1, wherein the plurality of product samples comprises a plurality of video clips.

3. The method of claim 1, wherein the plurality of product samples comprises a plurality of audio-clips.

4. The method of claim 3, wherein the product is an audio CD containing a plurality of individual music tracks and the product content information comprises a plurality of music track identifiers, each of the plurality of music track identifiers identifying one of the individual music tracks.

5. The method of claim 4, further comprising:
    in response to the user selecting one of the individual music tracks, transmitting from the user sampling device to the server a message containing an identifier identifying the selected individual music track;
    in response to receiving the message, retrieving a product content sample based on the received identifier; and
    transmitting the retrieved product content sample to the user sampling device, wherein the user sampling device is configured to automatically play the transmitted content sample upon receiving it from the server.

6. The method of claim 5, wherein the server is directly coupled to the POS database.

7. The method of claim 6, wherein the product content information further comprises an information identifying the genre of the movie, the movie's rating, the movie's director and/or a list of actors appearing in the movie.

8. The method of claim 1, wherein the product is a DVD storing a movie and the product content information comprises the title of the movie.

9. The method of claim 1, wherein the step of communicatively connecting comprises inserting a plug connected to the cable into a socket of the sampling station and providing power to sampling station via the cable.

10. The method of claim 9, wherein the step of communicatively connecting further comprises transmitting a dynamic host configuration protocol message from the sampling station.

11. The method of claim 1, wherein a label displaying the location identifier is disposed on a mounting bracket to which the sampling station is mounted.

12. The method of claim 1, further comprising assigning to the sampling station a time-to-idle value indicating how much time must elapse subsequent to the last customer interaction with the sampling station before transmitting from the sampling system to the server a request for a default media presentation loop.

13. A media sampling method, comprising:
storing a plurality of product content samples and product content information;
operating a point-of-sale (POS) system within a retail site, the point-of-sale system comprising a POS database storing real-time product inventory information;
disposing at a location within the retail site a sampling station, the sampling station being operable to enable a user of the sampling station to listen to and/or view one or more of the product content samples and to obtain product content information for a particular product, and the sampling station comprising a display device, a bar code scanner, and a headphone;
in response to the user using the sampling station to obtain product content information for a particular product, selecting a set of other products to bring to the attention of the user; and
for each of the selected other products, displaying on the display device of the sampling station an identifier identifying the selected other product,
wherein the selecting step comprises:
selecting an other product based, at least in part, on the particular product,
retrieving real-time product inventory information from the POS system for the selected other product,
using the retrieved real-time product inventory information to determine whether the selected other product is included in the inventory of the retail-site, and
if it is determined that the selected other product is included in the inventory, then including the selected other product in the set of other products, otherwise not including the selected other product in the set of other products.

14. A media sampling method, comprising:
storing a plurality of product content samples and product content information;
operating a point-of-sale (POS) system within a retail site, the point-of-sale system comprising a POS database storing real-time product inventory information;
disposing at a location within the retail site a sampling station, the sampling station being operable to enable a user of the sampling station to listen to and/or view one or more of the product content samples and to obtain product content information for a particular product, and the sampling station comprising a display device, a bar code scanner, and a headphone;
in response to the user using the sampling station to obtain product content information for a particular product, selecting a set of other products to bring to the attention of the user; and
for each of the selected other products, displaying on the display device of the sampling station an identifier identifying the selected other product, wherein
the step of selecting a set of other products comprises:
retrieving real-time information from the POS system; and using the retrieved real-time information to select one or more products to include in said set of other products.

* * * * *